US012770184B2

(12) United States Patent
Osler et al.

(10) Patent No.: US 12,770,184 B2
(45) Date of Patent: Oct. 20, 2026

(54) SYSTEM AND METHOD OF INFINITE OFFER CURVE AND LINKING AND LAYERING ON DIGITAL ASSETS

(71) Applicant: WeR1 Corp., Brooklyn, NY (US)

(72) Inventors: George Osler, Melrose (SA); Debbie Osler, Melrose (SA); Michael Sean Sanderson, Brooklyn, NY (US); Martin Zschornak, Halle (DE)

(73) Assignee: WeR1 Corp., Brooklyn, NY (US)

( * ) Notice: Subject to any disclaimer, the term of this patent is extended or adjusted under 35 U.S.C. 154(b) by 147 days.

(21) Appl. No.: 18/237,523

(22) Filed: Aug. 24, 2023

(65) Prior Publication Data

US 2024/0070769 A1 Feb. 29, 2024

Related U.S. Application Data

(60) Provisional application No. 63/400,838, filed on Aug. 25, 2022.

(51) Int. Cl.
*G06Q 30/08* (2012.01)
*G06Q 40/04* (2012.01)

(52) U.S. Cl.
CPC ............. *G06Q 30/08* (2013.01); *G06Q 40/04* (2013.01)

(58) Field of Classification Search
CPC ............................... G06Q 30/08; G06Q 40/04
See application file for complete search history.

(56) References Cited

U.S. PATENT DOCUMENTS 7,941,364 B2 * 5/2011 Peterffy ................. G06Q 40/04 705/38
8,577,746 B1 * 11/2013 Milgrom ................ G06Q 30/08 705/37
8,589,269 B1 * 11/2013 Bendel ................... G06Q 40/06 705/35
10,936,580 B2 * 3/2021 Shi ....................... G06Q 30/018
11,139,955 B1 * 10/2021 So ....................... G06Q 20/3674
11,188,977 B2 * 11/2021 Youb ....................... G06F 21/64
11,282,139 B1 * 3/2022 Winklevoss ........... G06Q 40/04
11,334,883 B1 * 5/2022 Auerbach ............ G06Q 20/223
(Continued)

FOREIGN PATENT DOCUMENTS

AU 2001292891 A1 * 9/2001 ............. G06Q 30/00
AU 2005220797 A1 * 10/2006 ............. G06Q 30/00
CA 2895354 C * 8/2018 ............. G06Q 40/04

*Primary Examiner* — Oluseye Iwarere
(74) *Attorney, Agent, or Firm* — Howard & Howard Attorneys PLLC

(57) ABSTRACT

A system and method of infinite offer curve includes an application executes an algorithm to allow a digital asset creator to create a digital asset, offer a percentage of digital creator shares in the digital asset for sale, conduct an auction at a time of listing the digital creator shares for sale, determine an initial threshold price for the digital creator shares, wherein the auction is conducted by inviting fans to participate in an initial offering of the digital creator shares, bidding by the fans a set amount at a price level to purchase, and aggregating all bids to determine by the IOC the initial threshold price and number of liquidity shares to be issued and sold against available digital creator shares for sale, and issue the liquidity shares at the initial threshold price and selling the liquidity shares to successful bidders in the auction.

21 Claims, 23 Drawing Sheets

(56) References Cited

U.S. PATENT DOCUMENTS

| | | | | |
|---|---|---|---|---|
| 11,430,066 | B2 * | 8/2022 | Doney | G06Q 20/3827 |
| 11,481,815 | B1 * | 10/2022 | Aviv | G06Q 20/1235 |
| 11,501,297 | B1 * | 11/2022 | Tai | G06Q 20/401 |
| 11,522,700 | B1 * | 12/2022 | Auerbach | H04L 9/3213 |
| 11,620,649 | B2 * | 4/2023 | Meinzer | G06Q 10/06393 705/7.29 |
| 11,909,860 | B1 * | 2/2024 | So | G06Q 40/06 |
| 12,093,942 | B1 * | 9/2024 | Auerbach | G06Q 20/3829 |
| 12,141,871 | B1 * | 11/2024 | James | G06Q 20/065 |
| 12,265,953 | B1 * | 4/2025 | Harrison | H04L 9/0825 |
| 2006/0041501 | A1 * | 2/2006 | Tabata | G06Q 40/04 705/37 |
| 2006/0085321 | A1 * | 4/2006 | Staib | G06Q 30/08 705/37 |
| 2008/0313095 | A1 * | 12/2008 | Shalen | G06Q 40/06 705/37 |
| 2009/0077092 | A1 * | 3/2009 | Knight | G06Q 30/08 |
| 2009/0287592 | A1 * | 11/2009 | Brooks | G06Q 30/02 705/35 |
| 2012/0078775 | A1 * | 3/2012 | Callahan | G06Q 40/04 705/37 |
| 2012/0136807 | A1 * | 5/2012 | Bendel | G06Q 40/04 705/36 R |
| 2012/0226538 | A1 * | 9/2012 | Tawakol | G06Q 30/08 705/14.23 |
| 2013/0073410 | A1 * | 3/2013 | Bhogal | G06Q 30/08 705/26.3 |
| 2013/0073411 | A1 * | 3/2013 | Bhogal | G06Q 30/08 705/26.3 |
| 2013/0073413 | A1 * | 3/2013 | Bhogal | G06Q 30/08 705/26.3 |
| 2013/0103532 | A1 * | 4/2013 | Emura | G06Q 30/08 705/26.3 |
| 2013/0204733 | A1 * | 8/2013 | Bhogal | G06Q 30/08 705/26.3 |
| 2015/0178790 | A1 * | 6/2015 | Yi | G06Q 30/0202 705/14.69 |
| 2017/0041132 | A1 * | 2/2017 | Nicholls | H04L 9/0825 |
| 2018/0040060 | A1 * | 2/2018 | Kleinberg | G06Q 20/3829 |
| 2018/0189866 | A1 * | 7/2018 | Dhondse | G06Q 30/08 |
| 2020/0005369 | A1 * | 1/2020 | Haberman | G06Q 20/123 |
| 2020/0226687 | A1 * | 7/2020 | Krishna | H04L 9/0643 |
| 2020/0279321 | A1 * | 9/2020 | Wang | H04L 63/08 |
| 2021/0374695 | A1 * | 12/2021 | Hanisch | G06Q 20/12 |
| 2022/0084120 | A1 * | 3/2022 | Khurana | G06Q 30/0206 |
| 2022/0122050 | A1 * | 4/2022 | Pacella | H04L 63/108 |
| 2022/0188811 | A1 * | 6/2022 | Petersen | G06Q 20/3676 |
| 2022/0215076 | A1 * | 7/2022 | Goldston | G06F 21/16 |
| 2022/0237599 | A1 * | 7/2022 | Petersen | G06Q 20/26 |
| 2023/0055618 | A1 * | 2/2023 | Jakobsson | G06Q 30/0601 |
| 2023/0075884 | A1 * | 3/2023 | Jakobsson | H04L 9/50 |
| 2024/0046318 | A1 * | 2/2024 | Muriqi | G06Q 20/389 |
| 2024/0054481 | A1 * | 2/2024 | Nagao | G06Q 20/1235 |
| 2024/0070769 | A1 * | 2/2024 | Osler | G06Q 40/04 |
| 2024/0152906 | A1 * | 5/2024 | Fields | G06Q 20/3672 |
| 2024/0257240 | A1 * | 8/2024 | Snyder | G06Q 40/03 |
| 2024/0362601 | A1 * | 10/2024 | Lau | G06Q 30/06 |

* cited by examiner

100

Illustration: As Price increases, Liquidity Share issue declines exponentially

Illustration: Exponentially declining new share issue keeps the Total shares in issue relatively stable Infinite Offer Curve Mathematics

*Assuming initial number of shares is 1000*
*And new shares are issue to the equivalent value of 10% of the increase of value of those initial shares then:*
*Let Sn= the number of new shares issued at each integer price*
*P = Price of threshold shares*
*Sn =f(P), follows the curve:*

$$Sn = \frac{100}{P}$$

*The total number of shares (S) follows the curve:*

$$P = 1000 + \int \frac{100}{S} d(S)$$
$$= 1000 + 100 \times \ln(S)$$

*Or*

$$|S| = e^{\frac{P-1000}{100}}$$

FIG. 7

FIG. 17
9:41
Back
Miyagi
Saturday Night Closing Dance
Market Value
$21,100
My Investment
$50
1D
1M
3M
1Y
All time
Total Market Value
$12,780
$30,000
Jan 2020
Jun 2020
Jan 2021
Jun 2021
Jan 2022
Market Value
$21,100
Bid
$23.00
Ask
$21.00
Investors
420
Invest

FIG. 22
9:41
Invest
Performance
Portfolio
History
Creations
Search
Gabriel Ananda
Personal
Total
Value
$945.00
Earnings
$160.00
Digital Music Asset
Creator
Investors
Value
Earnings
Soulful Techno 94
Gabriel Ananda
370
$150.00
+$30.00
Mumbai Sinner
Gabriel Ananda
500
$250.00
+$55.00
Betoko - Foreverness (remix)
Gabriel Ananda
640
$320.00
+$40.00
Tachyon Dream
Gabriel Ananda
300
$125.00
+$20.00
Soulful Techno 93
Gabriel Ananda
275
$100.00
+$15.00
Explore
Library
Invest
Tribe
Oracle

SYSTEM AND METHOD OF INFINITE OFFER CURVE AND LINKING AND LAYERING ON DIGITAL ASSETS

CROSS-REFERENCE TO RELATED APPLICATION(S)

The present application claims the benefit of and priority to U.S. Provisional Patent Application Ser. No. 63/400,838, filed Aug. 25, 2022, the entire disclosure of which is hereby expressly incorporated by reference.

BACKGROUND OF THE INVENTION

1. Field of the Invention

The present invention relates generally to digital assets and, more particularly to, a system and method of infinite offer curve and linking and layering on digital assets.

2. Description of the Related Art

It is known that musicians typically create works of music. These works of music typically are licensed through large licensing companies such as ASCAP and/or BMI. Other times, the musician themselves may attempt to sell copies of their works on websites or at performances.

It is desirable to raise awareness and interest in an Artist's/DJ's (Creator's) musical works by allowing fans to invest in their works. It is also desirable to enable the Influencers (fans) to have an economic interest in the success of the Artists/DJs (Creators) because they are an important part of enabling and allowing Artists/DJs (Creators) to raise money for themselves by selling interests in their works and in so doing further encouraging interest in these works and themselves. It is further desirable to encourage liquidity through the diversity of ownership and make ownership available to all fans who are interested. It is still further desirable to ensure that the artist/DJ (Creator) is rewarded in the long term, should his/her works prove to be successful in the long term.

It is known that the DJ Set (a Holon) can tell a story through a Sound Journey so much more than playing a discreet list of individual tracks one after the other. Through the DJs synthesizing, overlaying, and integrating the track components, they can curate new creative works specific to a set/setting or mood. It is also known that DJ Sets are not monetizable and are not recognized as unique creative works. They do not acknowledge the creative works of the underlying tracks and sound bytes they make use of, and there is no system for acknowledging the new creativity while simultaneously acknowledging the source of the creative elements (components) used in this new creative work (a new Holon; something that is simultaneously a whole in and of itself as well as a part of a larger whole. In other words, holons can be understood as the constituent part—wholes of a hierarchy).

When a new creative work is made, there is no mechanism to acknowledge the components that make up the new whole (Holon). The result is not only that the Holon cannot be monetized, but also that the components have limited ability to have long-term relevance and financial viability.

Therefore, there is a need in the art to provide a system and method of infinite offer curve and linking and layering on digital assets that meets at least one of these desires.

SUMMARY OF THE INVENTION

Accordingly, the present invention provides a system and method of infinite offer curve and linking and layer on digital assets including a database configured to store digital assets, a computing system configured to communicate with the database, and an application executable by a processor of a user computing device and to communicate with the computing system. The application is configured to have the processor execute an algorithm with instructions to allow a digital asset creator to create a digital asset, offer a percentage of digital creator shares in the digital asset for sale, conduct an auction at a time of listing the digital creator shares for sale, determine an initial threshold price for the digital creator shares, wherein the auction is conducted by inviting fans to participate in an initial offering of the digital creator shares in the digital asset, bidding by the fans a set amount at a price level to purchase an interest in the digital asset, and aggregating all bids to determine by the IOC the initial threshold price and number of liquidity shares to be issued and sold against available digital creator shares for sale, and issue the liquidity shares at the initial threshold price determined by the IOC and selling the liquidity shares to successful bidders in the auction on a prorate basis in accordance with the bids made.

The system and method provide specific sequencing, linking, and layering of digital assets including underlying individual tracks, sound bytes, or creative works. This linking and layering is not limited to two layers only. Just as there are any possible number of components to a DJ set, there can also be any number of layers to a holon/derivative creative works. This new Holon gives renewed life to the individual tracks and by making it possible to monetize the Holon, the components can also be monetized.

One advantage of the present invention is that a new system and method of infinite offer curve and linking and layering on digital assets is provided for a transparent fair connected music experience and investment ecosystem and platform. Another advantage of the present invention is that the system and method are used to create and maintain strong links between artist and fans, which an important aspect of this is the establishment of a market for Artists'/DJs' (Creators') musical assets listed as fractional digital assets in the system. Yet another advantage of the present invention is that the system and method provide fractional nature of the digital asset, which means that there can and will be multiple owners and investors in a unique digital asset—each with a vested interest in the assets success in generating ongoing revenue through subscriptions and demand for use. Still another advantage of the present invention is that the system and method includes an Infinite Offer Curve (IOC) to support the virtuous and symbiotic relationship that exists between Artists/DJs (Creators) and their fans/investors—early in the success of the share, fans can participate through investment—owning something means they are more committed to being part of its real-world success—creator starts to receive real income as fans participate in buying process. A further advantage of the present invention is that the system and method provide linking and layering of digital assets to create a fair reward system that acknowledges both new creative works as holons being greater than the sum of the parts together with the digital works and creators thereof which form the foundation or building blocks of each new Holon. Yet a further advantage of the present invention is that the system and method create a new type of reward system that incentivizes creatives to make new works and creates a transparent reward system for all.

These and other objects, advantages, and features of the present invention will become better understood from the following detailed description of one exemplary embodiment of the present invention that is described in conjunction with the accompanying drawings.

BRIEF DESCRIPTION OF THE DRAWINGS

FIG. 7 is a view of Infinite Offer Curve Mathematics for the method of FIG. 4.

DESCRIPTION OF THE PREFERRED EMBODIMENT(S)

Figure 1:
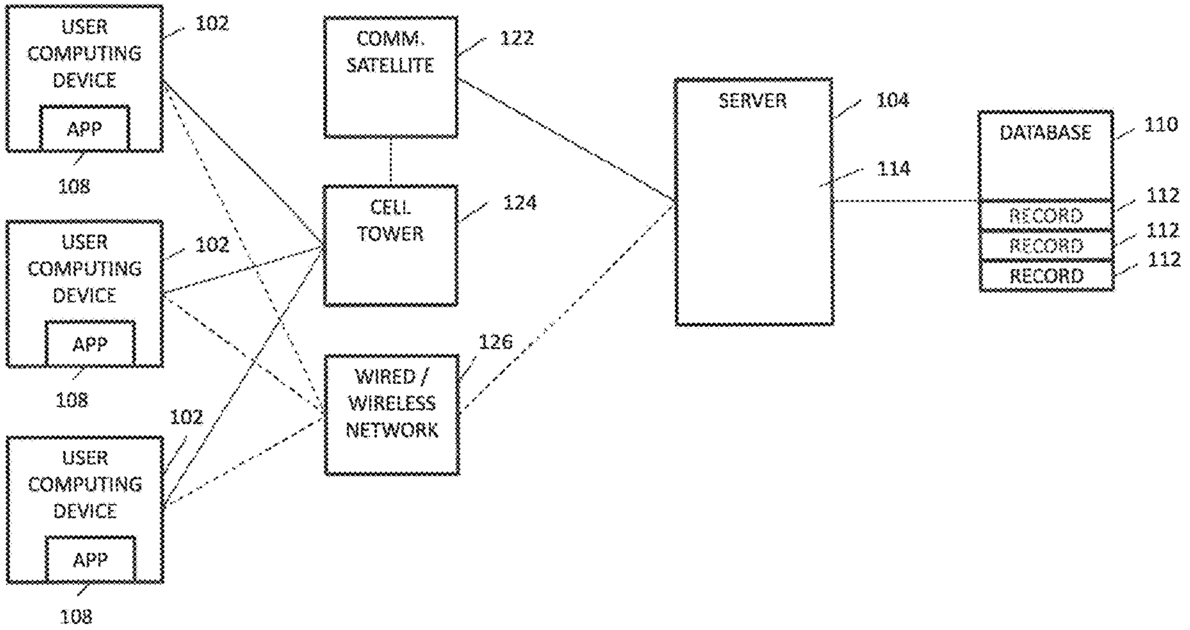
FIG. 1 is a block diagram of a system of infinite offer curve and linking and layering on digital assets, in accordance with one embodiment of the present invention.

In the following description, numerous specific details are set forth to provide a thorough understanding of the present invention. It will be apparent, however, to one having ordinary skill in the art that the specific detail need not be employed to practice the present invention. In other instances, well-known materials or methods have not been described in detail to avoid obscuring the present invention.

Reference throughout this specification to "one embodiment", "an embodiment", "one example" or "an example" means that a particular feature, structure or characteristic described in connection with the embodiment of example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system". Furthermore, the present invention may take the form of a computer program product embodied in any tangible media or expression having computer-usable program code embodied in the media.

Any combination of one or more computer-usable or computer-readable media (or medium) may be utilized. For example, a computer-readable media may include one or more of a portable computer diskette, a hard disk, a random-access memory (RAM) device, a read-only memory (ROM) device, an erasable programmable read-only memory (EPROM or Flash memory) device, a portable compact disc read-only memory (CD-ROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisional via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The block diagram(s), flow diagram(s), and flowchart(s) illustrate the architecture, functionality, and operation of possible implementations of systems, methods, and computer program products according to various embodiments of the present invention. In this regard, each block in the flowchart, flow diagrams, or block diagrams may represent a module, segment, or portion of code, which comprises one or more executable instructions for implementing the specified logical function(s). It will also be noted that each block of the block diagrams, flow diagrams, and/or flowchart illustrations, and combinations of blocks in the block diagrams, flow diagrams, and/or flowchart illustrations, may be implemented by special purpose hardware-based systems that perform the specified functions or acts, or combinations of special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart, flow diagram, and/or block diagram block or blocks.

Several (or different) elements discussed below, and/or claimed, are described as being "coupled", "in communication with" or "configured to be in communication with". This terminology is intended to be non-limiting, and where appropriate, be interpreted to include without limitation, wired and wireless communication using any one or a plurality of suitable protocols, as well as communication methods that are constantly maintained, are made on a periodic basis, and/or made or initiated on an as needed basis.

The present disclosure particularly describes a system, method, and non-transitory computer readable medium for enabling users such as original artists to sell shares in their digital assets such as musical works and users such as fans to purchase shares in the digital assets such as musical works in a convenient, efficient, and social manner. The present disclosure provides a system, method, and non-transitory computer readable medium of infinite offer curve on digital assets, more particularly, a platform of an infinite offer curve (IOC) on digital assets. The IOC platform includes a system and method that will provide access to real-time purchase of digital assets. It should be appreciated that the IOC platform is available as an application that is delivered from a desktop or laptop browser, or on a mobile device such as a smartphone or tablet.

The system is designed to allow a user to sell shares in the digital assets and/or purchase shares in the digital assets. The system allows public purchases of shares in the original Artist/DJ (Creator) issuing the digital asset with the intent to own shares.

FIG. 1 is a block diagram of an exemplary system 100 that may be used for the infinite offer curve platform for digital assets. As used herein, the term “digital assets” includes musical compositions, DJ sets, films, etc. In one embodiment, the system 100 enables a user to purchase shares in a digital asset such as a musical composition.

In one embodiment, the system 100 includes one or more user computing devices 102, and a computing system including a user server 104 configured to communicate with a database 110 to be described. The various components of the system 100 may be connected by one or more wired or wireless networks. Although three user computing devices 102 are illustrated in FIG. 1, the system 100 may include any suitable number of the user computing devices 102. Also, while the system 100 is illustrated with the above components, it should be appreciated that one or more components of the system 100 may be combined or split apart while remaining within the scope of the disclosure.

The user computing device 102 is a computing device that may be operated by a user to buy shares in the digital assets. The user computing devices 102 may include a mobile phone, a personal digital assistant (PDA), a tablet computer, a wearable computing device, a laptop computer, a desktop computer, a kiosk, a point-of-sale terminal, a virtual reality device, an augmented reality device, or any other suitable computing device that enables the user computing device 102 to operate as described herein. In one embodiment, an application or “app” 108 is installed on each user computing device 102 to enable the user to purchase shares in the digital assets. In another embodiment, some or all the functionality of user computing device 102 and/or application 108 may be embodied in a cashier-operated register, point-of-sale terminal, or the like.

The user server 104 is a computing device that enables multiple user computing devices 102 to buy shares in the digital assets. In one embodiment, the user server 104 stores user information for each user in a user database 110 and associates the user information with the user computing device 102 that each user uses to access the user server 104. The user information may be stored in a plurality of records 112 in the user database 110. The records 112 may include a username, a user password, a birth date, a scanned image of an identification document such as a driver’s license or passport, funds available to the user, payment information including an account number to a financial institution used by the user, and/or any other suitable information or record. It should be appreciated that the user server 104 may retrieve the records 112 from the user database 110 by querying the user database 110 during operation.

In one embodiment, the system 100 includes devices that enable the user computing devices 102 to transmit and receive data to and from the user server 104. The devices may include one or more communication satellite 122, one or more cellular tower 124, and devices forming one or more wired or wireless networks 126. In one embodiment in which the user computing devices 102 are cellular phones, the user computing devices 102 may communicate with the user server 104 by transmitting signals to the cellular tower 124 which then transmits the signals to the communication satellite 122. The communication satellite 122 transmits the signals to the user server 104. In turn, the user server 104 may transmit signals to the user computing devices 102 in the reverse direction via the communication satellite 122 and the cellular tower 124. It should be appreciated that the user computing devices 102 may communicate with the user server 104 via one or more wired or wireless networks 126, such as the Internet.

In one embodiment, the signals transmitted between the user computing devices 102 and the user server 104 are encrypted using a suitable encryption algorithm. For example, the signals may be encrypted using a public key infrastructure (PKI) algorithm. In another embodiment, the signals may be encrypted using any suitable algorithm.

Figure 2:
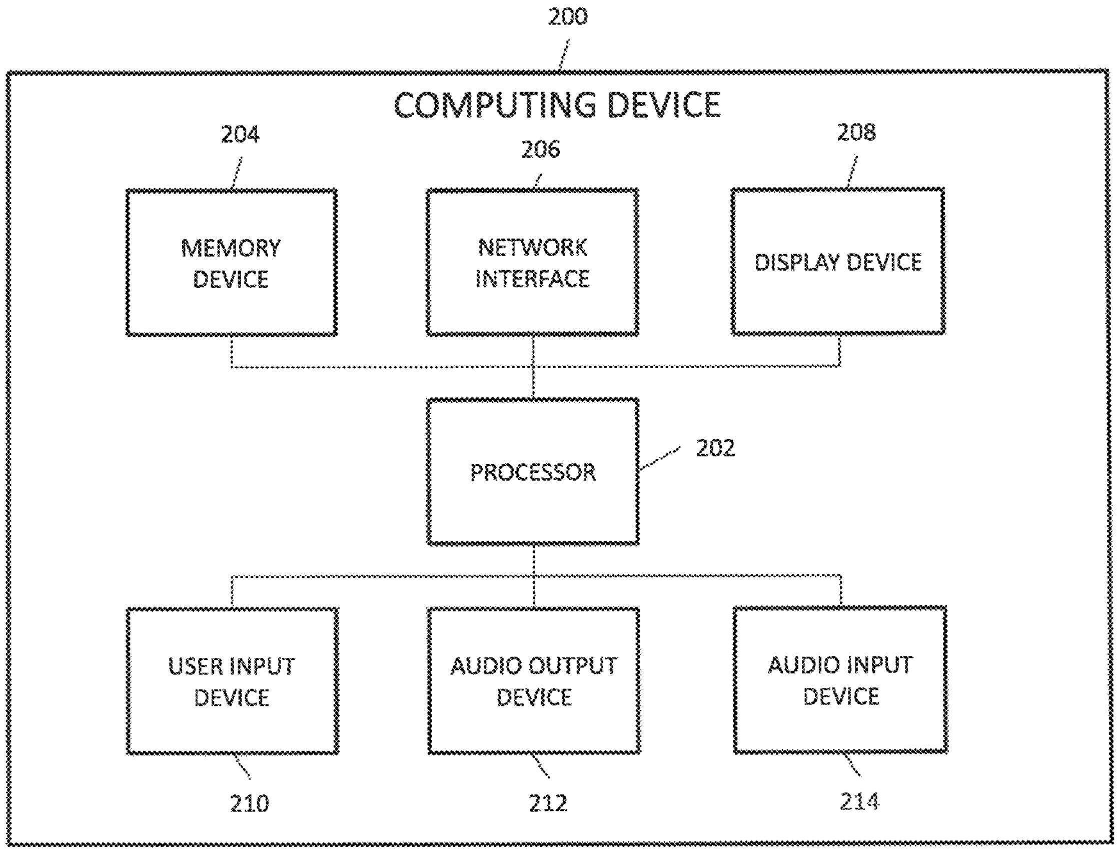
FIG. 2 is a block diagram of a user computing device that may be used with the system shown in FIG. 1.

FIG. 2 is a block diagram of one embodiment of the user computing device 102 that may be used with the system 100 (shown in FIG. 1). In one embodiment, the user computing device 102 and user server 104 described in the system 100 may be implemented as the user computing device 102. However, it should be recognized that one or more components of the system 100 may not be included in the user computing device 102 such as the user server 104.

In one embodiment, the user computing device 102 includes a processor 202, a computer-readable memory device 204, and a network interface 206. In one embodiment, the user computing device 102 may also include a display device 208, a user input device 210, an audio output device 212, and/or an audio input device 214. It should be appreciated that the memory device 204, network interface 206, display device 208, and user input device 210 (if provided) may be connected to the processor 202 and/or to each other via any suitable bus or busses, interfaces, or other mechanisms.

The processor 202 includes any suitable programmable circuit including one or more microcontrollers, microprocessors, application specific integrated circuits (ASICs), systems on a chip (SoCs), programmable logic circuits (PLCs), field programmable gate arrays (FPGAs), and/or any other circuit capable of executing an algorithm with instructions for the steps or functions described herein. It should be appreciated that the above examples are exemplary only, and thus are not intended to limit in any way the definition and/or meaning of the term “processor.”

The memory device 204 is an electronic storage device that includes one or more non-transitory computer readable medium, such as, without limitation, random access memory (RAM), flash memory, a hard disk drive, a solid-state drive, a compact disc, a digital video disc, and/or any suitable memory. The memory device 204 may include data as well as an algorithm with instructions that is executable by the processor 202 to program the processor 202 to perform the steps or functions described herein. For example, the methods described herein may be performed by one or more processors 202 executing an algorithm with instructions stored within one or more of the memory devices 204.

The network interface 206 may include, without limitation, a network interface controller (NIC) or adapter, a radio frequency (RF) transceiver, a public switched telephone network (PSTN) interface controller, or any other communication device that enables the user computing device 102 to operate as described herein. In one embodiment, the network interface 206 may connect to the network interfaces 206 of the other user computing devices 102 of the system 100 through a network using any suitable wireless or wired communication protocol.

The display device 208 may include, without limitation, a liquid crystal display (LCD), a vacuum fluorescent display (VFD), a cathode ray tube (CRT), a plasma display, a light-emitting diode (LED) display, a projection display, a display integrated into a virtual reality or augmented reality device, and/or any suitable visual output device capable of displaying graphical data and text to a user. For example, the display device 208 may be used to display a graphical user interface 500 (to be described) associated with the application 108 to the user.

The user input device 210 may include, without limitation, a keyboard, a keypad, a touch screen, a mouse, a scroll wheel, a pointing device, a video input device that registers movement of a user (e.g., usable with an augmented reality input device or a virtual reality input device), and/or any other suitable device that enables the user to input data into the user computing device 102 and/or retrieve data from the user computing device 102.

The audio output device 212 may include, without limitation, one or more speakers or any other device that enables content to be audibly output from the computing device 200. For example, music or other audio content may be audibly output from the audio output device 212.

The audio input device 214 may include a microphone or another suitable device that enables the user to input audio commands into the user computing device 102. The audio input device 214 may employ speech recognition software to convert spoken commands from the user into digital data for use in operating the user computing device 102.

While the foregoing components have been described as being included within the user computing device 102, it should be appreciated that at least some of the user computing devices 102 may not include each component. For example, a server may not include the audio output device 212, audio input device 214, user input device 210, and/or display device 208. In addition, the user computing device 102 may include any suitable number of each individual computing device component. For example, the user computing device 102 may include a plurality of the processors 202 or processor cores, a plurality of the memory devices 204 (of the same or different types, sizes, etc.), and/or a plurality of the display devices 208.

Figure 3:
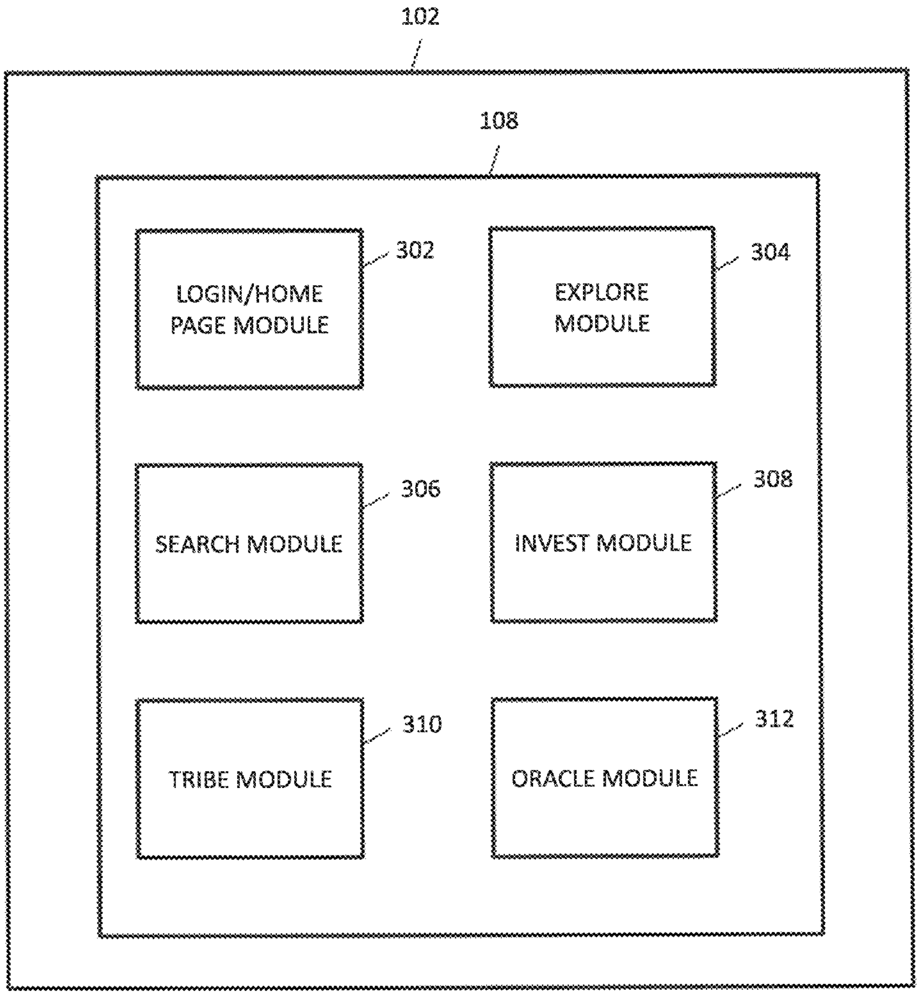
FIG. 3 is a block diagram of an exemplary application that may be used with the user computing device shown in FIG. 2.

FIG. 3 is a block diagram of an exemplary application 108 that is executable on the user computing device 102 (shown in FIG. 2) and that may be used with the system 100 (shown in FIG. 1). In one embodiment, the user computing device 102 may include a plurality of modules that may be embodied as one or more software modules within the application 108. In another embodiment, each module may include firmware and/or hardware components in addition to, or instead of, the software components within the application 108. The modules may include, for example, a login/home page module 302, an explore module 304, a search module 306, an invest module 308, a tribe module 310, and an oracle module 312. The modules 302-312 are also illustrated by screenshots of the application 108 in FIGS. 10-22.

For the method of the infinite offer curve of digital assets, shares can be divided into 3 classes:

1. Creator residual shares (10%) of those initially listed—cannot be sold;
2. Creator shares (90%) at initial listing—can be held or sold at discretion of owner; and
3. Liquidity shares, those issued by the infinite offer platform, according to an Infinite Offer Curve (IOC) based on threshold value of the digital asset.

The digital assets have the following characteristics:

Fractional ownership allows many and multiple owners;

Shares can be traded in fractions up to 1/1000's of a share; and

The original artist/DJ (the Creator) issuing the digital asset has a residual interest (10%) that can never be sold—this means that the creator will always have an interest in their work's ongoing success;

A 10% trading fee on any sales of the digital asset is levied on any current and future sales of shares in the digital asset, 5% going to the artist and 5% going to the IOC platform; and Infinite Offer Curve (IOC): If there is no willing seller at a price which is at or below the current threshold price, a determinable number of new shares (Liquidity shares) are available for purchase at a higher price than the current threshold price as determined by the IOC. Should a willing buyer purchase these more expensive shares, the threshold price is updated to the next new level of pricing in the IOC. As Shares available above the threshold price are purchased, they enter market circulation, and the new higher threshold price is set.

The following is an example of the method, according to the present invention:

Assuming initial number of shares is 1000 and new shares are issue to the equivalent value of 10% of the increase of value of those initial shares then:

Let Sn=the number of new shares issued at each integer price

P=Price of threshold shares

Sn=f(P), follows the curve:

$$Sn=100/P$$

The total number of shares (S) follows the curve:

$$P=1000+\text{integral}(100/S\times d(S))$$

$$=1000+100\times\ln(S)$$

$$\text{Or } |S|=e(P-1000/100)$$

The above formula is illustrated in FIG. 7.

Figure 5:
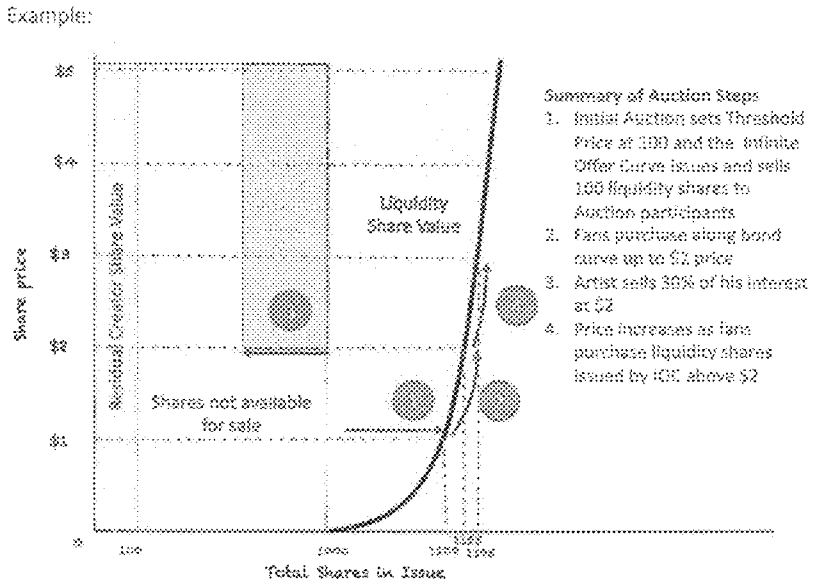
FIG. 5 is a graph of an example of share price versus total shares in issue and auction steps for the method of FIG. 4.

In the above example, the Artist/DJ (Creator) lists the digital asset with an initial number of shares set to 1000 (one thousand) and the Initial Threshold Price is determined by an upfront auction mechanism illustrated in FIG. 5. The Artist/DJ (Creator) can make available any percentage of his/her shares (from 0% up to 90%) at the Initial Threshold Price. The Infinite Offer Curve (IOC) means that new shares (Liquidity Shares) are available for purchase at each new higher price level above the Initial Threshold Price—the IOC mathematics determines the number of shares issued in relation to the price increase. The last purchase price of Liquidity shares determines the new Threshold Price level. Fans can now bid for available shares. Available shares are determined as Creator Shares are made available by the Artist/DJ (Creator) and Liquidity Shares are made available at prices above the Initial Threshold Price along the IOC. Even if there are no Creator Shares available, there will always be shares available at exponentially higher prices above the threshold price. As trades in Liquidity shares are realized, so the new threshold price is raised. Liquidity shares are available for purchase along the IOC at a rate of value equivalent to ten percent (10%) value of the digital asset as the overall value of the digital asset increases. The money generated from the sale of Liquidity shares is shared equally between the IOC platform and the Artist/DJ (Creator): a. five percent (5%) of the value flows to the artist/DJ; and b. five percent (5%) flows to the IOC platform. It should be appreciated that shares can be traded in fractions up to 1/1000 of a share.

It should be appreciated that Initial price increases will result in relatively more Liquidity shares being Issued, but as the price increases, the number of new shares issued drops exponentially, until the increase in total shares is all but negligible. This means that there are always some shares available for purchase, but it becomes increasingly difficult as the value of the shares increases.

Figure 6A:
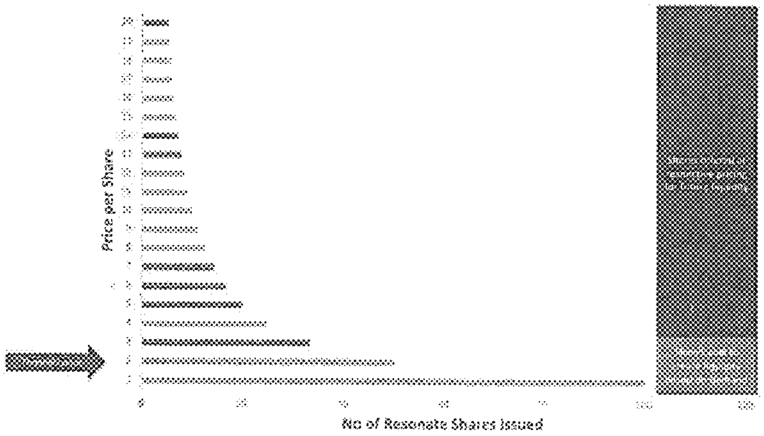
FIGS. 6A and 6B are graphs of price per share versus number of resonate shares issued and the number of shares issued versus share price for the method of FIG. 4.
Figure 6B:
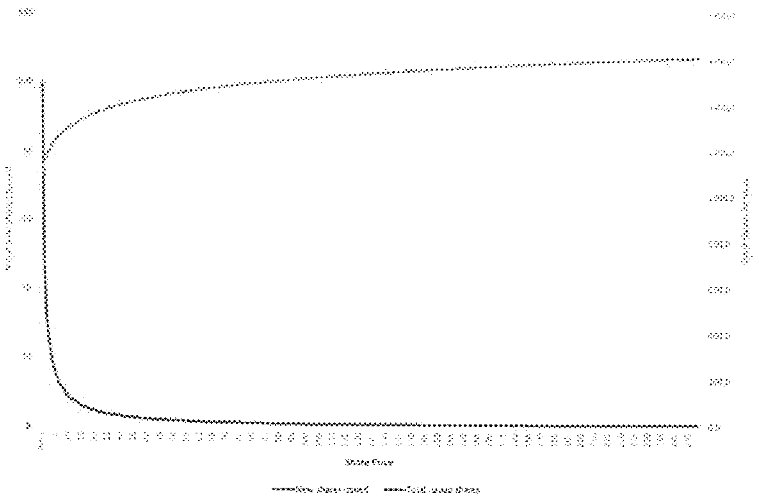

As the traded price of the shares rises, the number of new Liquidity shares issued (for each incremental increase in price) decreases exponentially (as shown in the graphs in FIG. 6). The moment market participants make offers to sell their shares at prices below the threshold price, these shares will be sold, and no new Liquidity shares will be issued and sold. The Threshold Price remains at the last highest price against which Liquidity shares were issued. New Liquidity shares will only be issued once there are bids at or above the current threshold price. Any Liquidity shares purchased along the lower section of the IOC (i.e., below current threshold price) are effectively already in circulation in the community. Liquidity shares above the threshold price remain available for issuance and sale at prices higher than the threshold price. It should be appreciated that the infinite offer curve allows the issue of enabling more value to the creator by issuing additional shares/units on a diminishing basis, based on the exponential growth in value of the assets, enabling more fans to participate through the additional liquidity created, especially in the event that the asset gets noticed and goes through a period of rapid growth subsequent to an initial listing.

Figure 4:
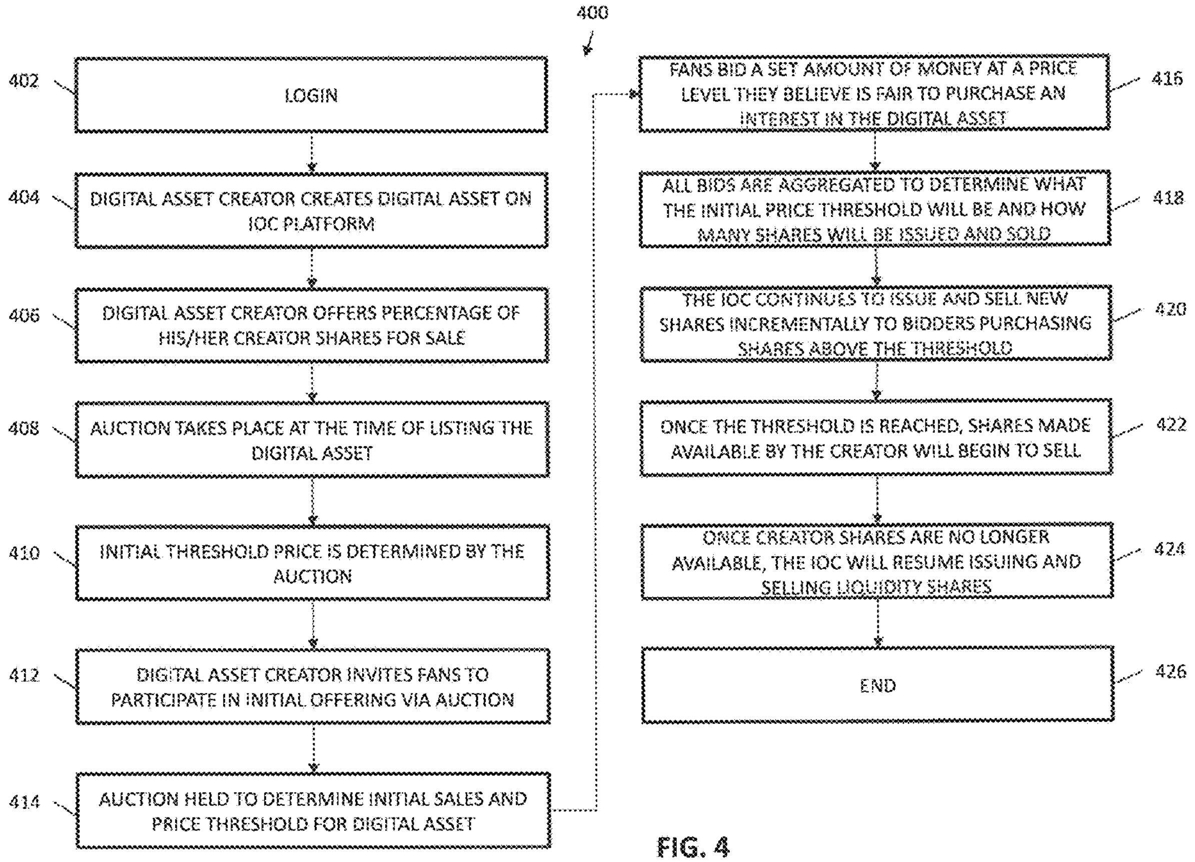
FIG. 4 is a flowchart of an exemplary method of infinite offer curve on digital assets that may be used with the system shown in FIG. 1.

FIG. 4 is a flow diagram of an exemplary method 400 of infinite offer curve for digital assets that may be used with the system 100 (shown in FIG. 1). While the method 400 is described with reference to a musical composition or creation, it should be appreciated that the method 400 may be used with any suitable digital asset, such as a digital film, and the like. The method 400 may be implemented by the user computing device 102 and/or user server 104, (shown in FIG. 1), such as by the processor 202 of the user computing device 102 and/or user server 104, executing an algorithm with computer-readable instructions stored within the memory device 204 of the user computing device 102 and user server 104. In another embodiment, the method 400 may be implemented by any suitable device of the system 100.

In one embodiment, the method 400 is an algorithm of instructions that includes the step 402 of logging in by a user of the user computing device 102 of the application (or app), such as the application 108, to buy shares in one or more digital assets. For example, a user may use a cellular phone to access the application 108 to purchase one or more shares in one or more digital assets. The method 400 includes the step 404 of a digital asset creator (Artist/DJ) creating a digital asset on the IOC platform. For example, the digital asset creator has a total of 1,000 initial shares—creator and residual creator shares—are issued. An Artist/DJ (Creator) or digital asset creator may create a DJ set. The method 400 includes the step 406 of the digital asset creator offering a percentage of his/her creator shares for sale. For example, the digital asset creator may offer 30% of his creator shares for sale at $2. It should be appreciated that the digital asset creator makes no shares available for sale at a price below $2.

The method 400 includes the step 408 of conducting an auction that takes place at the time of listing the digital asset. For example, an auction takes place at the time of listing the digital asset and based on this, an Initial Threshold Price is determined to be $1 per share by the Auction mechanism. The method includes steps 410-418 in which an Auction is conducted as follows: a. Creator invites fans to participate in the initial offering via Auction; b. Auction held to determine the initial sales and price threshold for the digital asset issued; c. Fans can bid a set amount of money at a price level that they believe is fair to purchase an interest in the digital asset; d. All bids are aggregated to determine what the Initial Threshold Price will be and how many shares will be issued and sold against available shares for sale; e. In this example, the Auction resulted in an Initial Threshold Price of $1; f Given that the creator has not made any shares available for sale below $2, the only shares available for purchase are one hundred (100) Liquidity shares that are issued and sold at the $1 level as per the IOC; g. These 100 shares are automatically issued and sold to the successful bidders in the Auction on a prorate basis in accordance with bids made; h. The Threshold price is set to $1; and i. $100 in proceeds are generated from Auction sale ($50 to Creator, $50 to IOC platform). It should be appreciated that the auction or starting point is secondary, as there could be a number of ways to start the process of selling shares.

The method 400 includes the step 420 of the IOC continuing to issue and sell new shares incrementally to bidders purchasing shares above the threshold. For example, the IOC continues to issue and sell new shares incrementally to bidders purchasing shares above the $1 level. In the example, another 55 Liquidity shares are issued and sold incrementally as the price increases to the $2 threshold.

The method 400 includes the step 422 of, once the threshold is reached, shares made available by the creator will begin to sell. For example, once the $2 threshold is reached, the 30% shares made available by the creator will begin to sell. All these will be sold before any new Liquidity shares are issued.

The method 400 includes the step 424 of, once creator shares are no longer available, the IOC will resume issuing and selling Liquidity shares. For example, once the Creator shares are no longer available, the IOC will resume issuing and selling Liquidity Shares at prices above $2 along the IOC.

The present disclosure also particularly describes a system, method, and non-transitory computer readable medium for containing several digital assets, digital music assets, or NFT's identified as types with a hierarchy. Each individual digital asset has the attributes of:

a. Type
b. Hierarchy layer
c. Retained Revenue
d. Pass-Through Revenue
e. Owners Creators can create new assets of a higher type from lower hierarchy assets.

The new creative work (Holon/DJ Set) is an Asset. It has a revenue distribution such that when revenue flows for the use of the Holon/DJ set, a portion of that revenue is retained by the new creative works owner. A portion flows through to the underlying derivative components. At each level, it is possible to acknowledge both the original creator and current rights owner.

Figure 8:
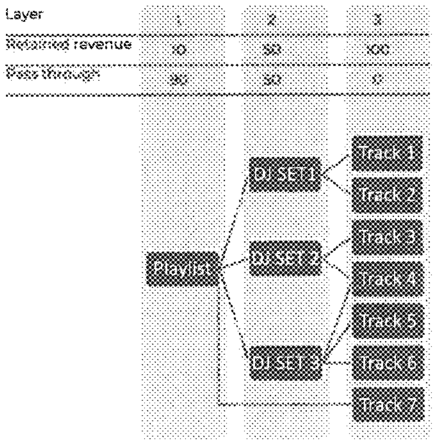
FIG. 8 is a chart of an exemplary embodiment of layering and linking of digital assets that may be used with the system shown in FIG. 1.

In the example of a DJ set as illustrated in FIG. 8, 50% of the revenue is retained by the creator/owner of the DJ Set creative work, and 50% flows to the underlying components or creative works in equal proportion. It should be appreciated that this could be adjusted to a time-weighted average of individual components.

In the example, the playlist forms another layer. This registry of components has use in all digital works where two or more components are combined to create a new and unique digital asset. This would be used in digital works such as: Cinematography, whereby a digital audiovisual asset is assembled using multiple audio and visual components, making something so much more meaningful (a film).

Digital design and distributed manufacturing platform. i.e. where a whole product is created, manufactured, and distributed on a decentralized platform where designers using multiple parts or assemblies create new products, including each part of the manufacturing process that attracts a portion of the revenue flow from the purchase price of the product. It should be appreciated that augmented reality or metaverse, where a new experience for users is created by combining components in other layers, enhancing set, setting and intention to create heightened or more meaningful experiences:

- Visual: 3D designed virtual architecture to create an ambience;
- Audio: Sets assembled from tracks, playlists assembled sets or tracks; and
- Platform: Connecting multiple users in the experience creates connection.

This leads to the possibility that more creative works are made possible by establishing a fair reward system. The use in both centralized and decentralized digital solutions in platforms include (but are not limited to): Blockchain, NFTs, music rights, virtual and augmented reality, digital printing, and visual experiences—any platform that is designed to reward creative and intellectual property content.

Each layer in the system 10 represents a type of digital asset. In the example of FIG. 8, layer 2 represents DJ sets. Revenue received from the use of any digital asset will be received by the digital asset, with a portion being retained and a portion being passed through to the derivative assets. It should be appreciated that this a listening/user experience revenue pathway distribution. It should also be appreciated that the IOC platform is included in the listening pathway as the provider of the platform enabling the listening experience.

The following properties and relations are attributed to these:

- Type: DJ set;
- Original Creator;
- Current owners of digital asset;
- Revenue retention 50% (This is the amount of revenue retained for the benefit of the owners of the digital asset, the balance flowing through to the derivative assets);
- Revenue pass through 50%; and
- Derivative assets (These are the acknowledged and rewarded tracks which will receive the pass-through revenue amounts.) In the IOC platform, any revenue pass-through is divided equally between the derivative assets. It should be appreciated that the possibility exists to share the revenue in other equitable proportions, e.g. time weighting, track success, etc.

Layer 1 represents music tracks. Each track has identifications or traits such as:

- Original Creator;
- Current owners; and
- Derivative assets: This could form another layer of assets used to construct the track, thereby acknowledging and rewarding the creator of the track plus parent creators. (People or assets on whose idea, this new idea and creative works have been built. It should be appreciated that this can be used in the case of remixes or constructing the track from multiple other digital assets.

Figure 9:
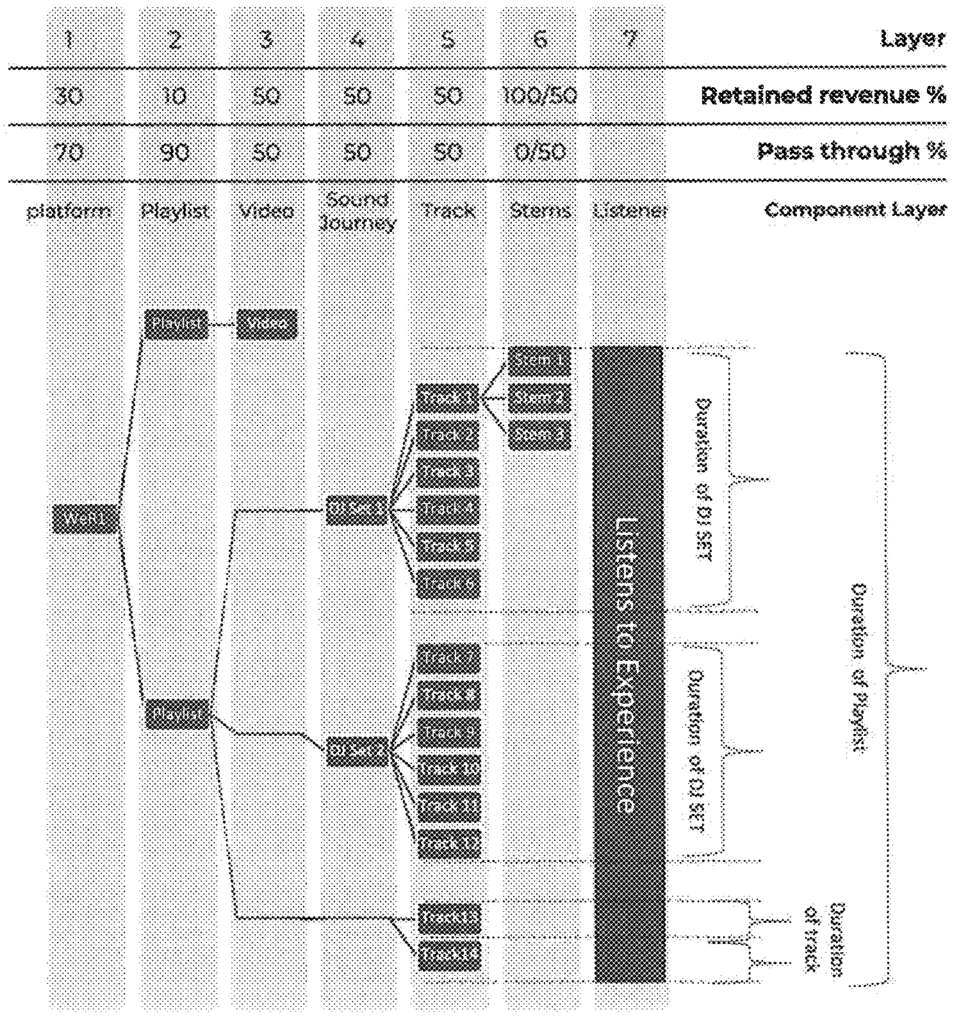
FIG. 9 is a chart of a layer of FIG. 8.
Figure 10:
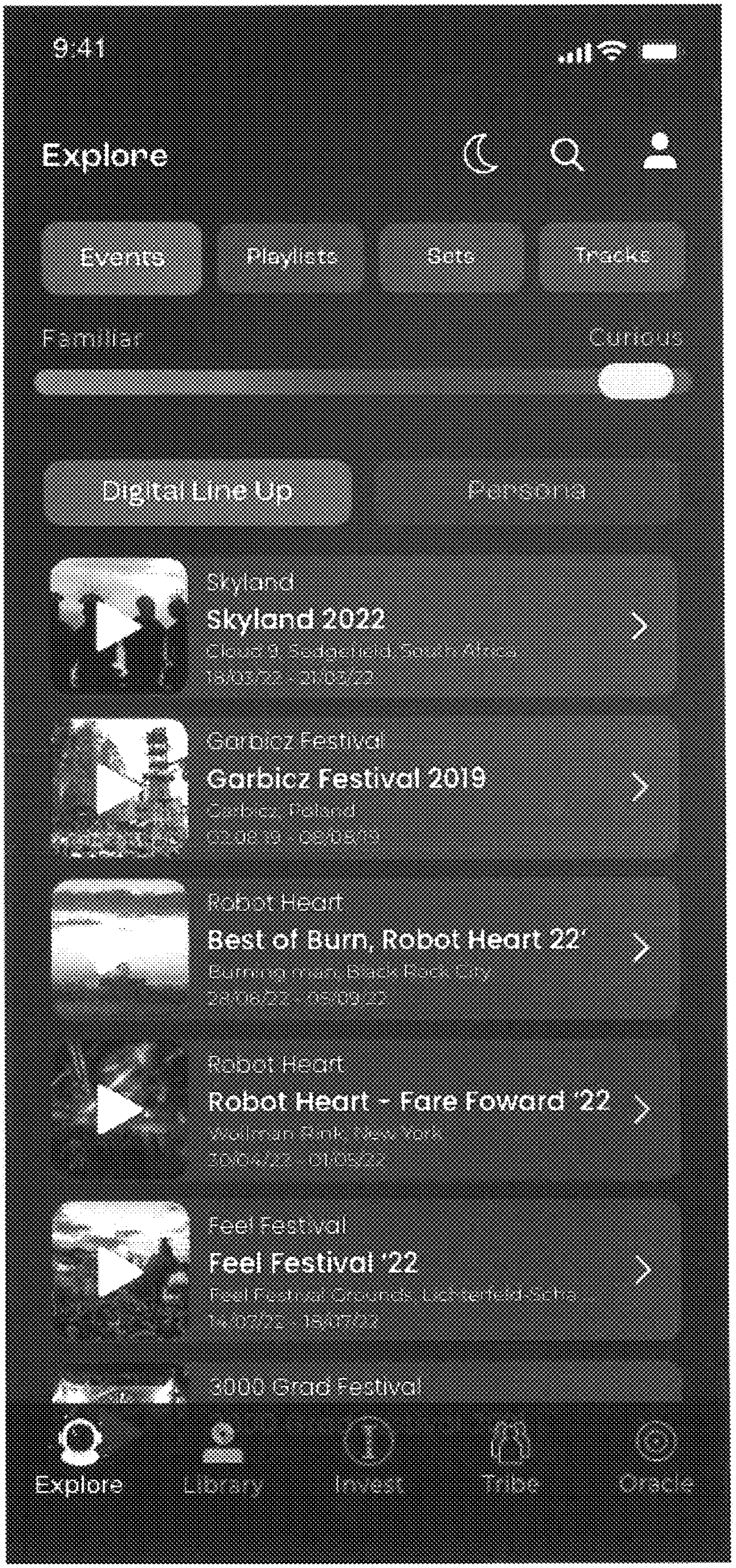
FIGS. 10-22 are screenshots of the application used with the system and method of FIGS. 1-4.
Figure 11:
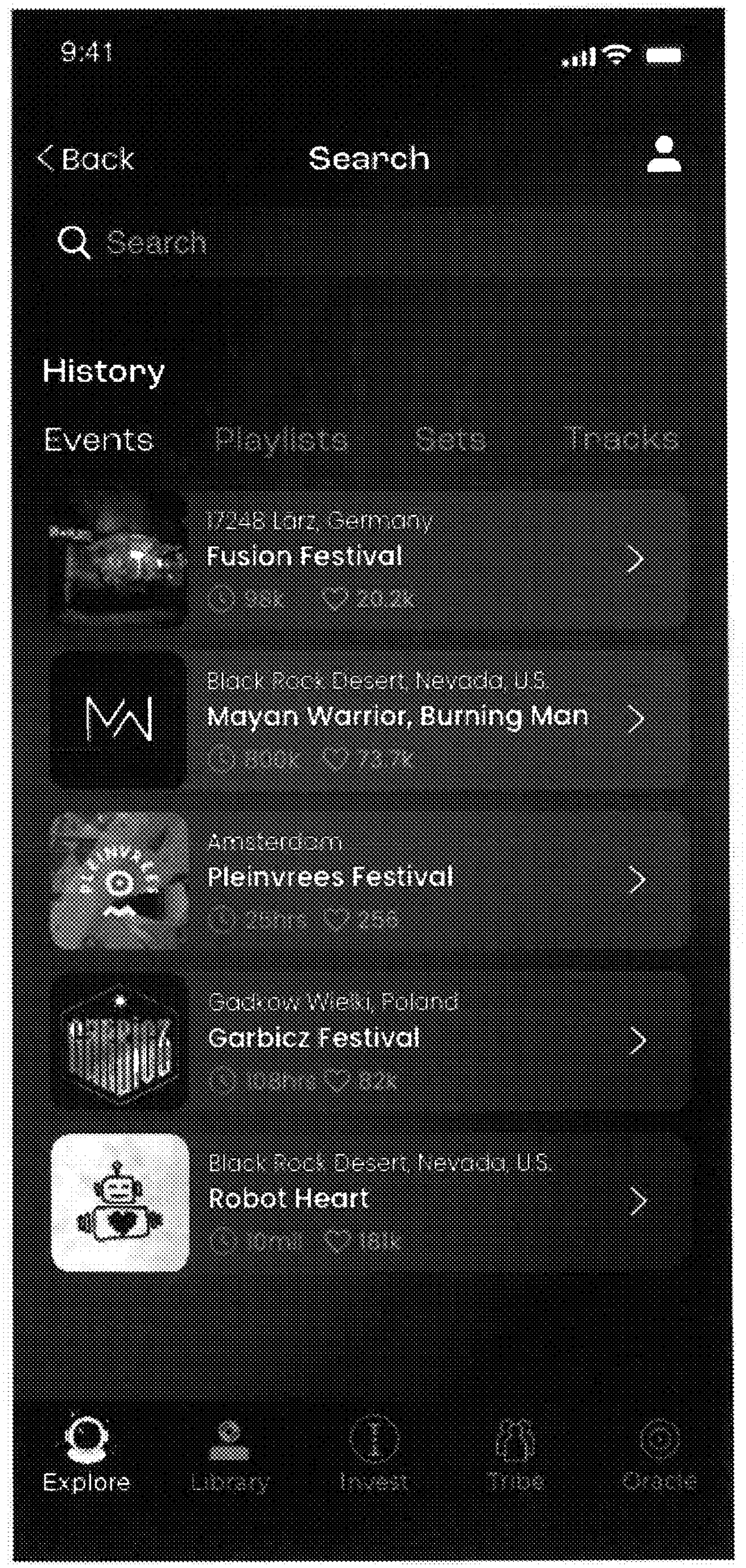
Figure 12:
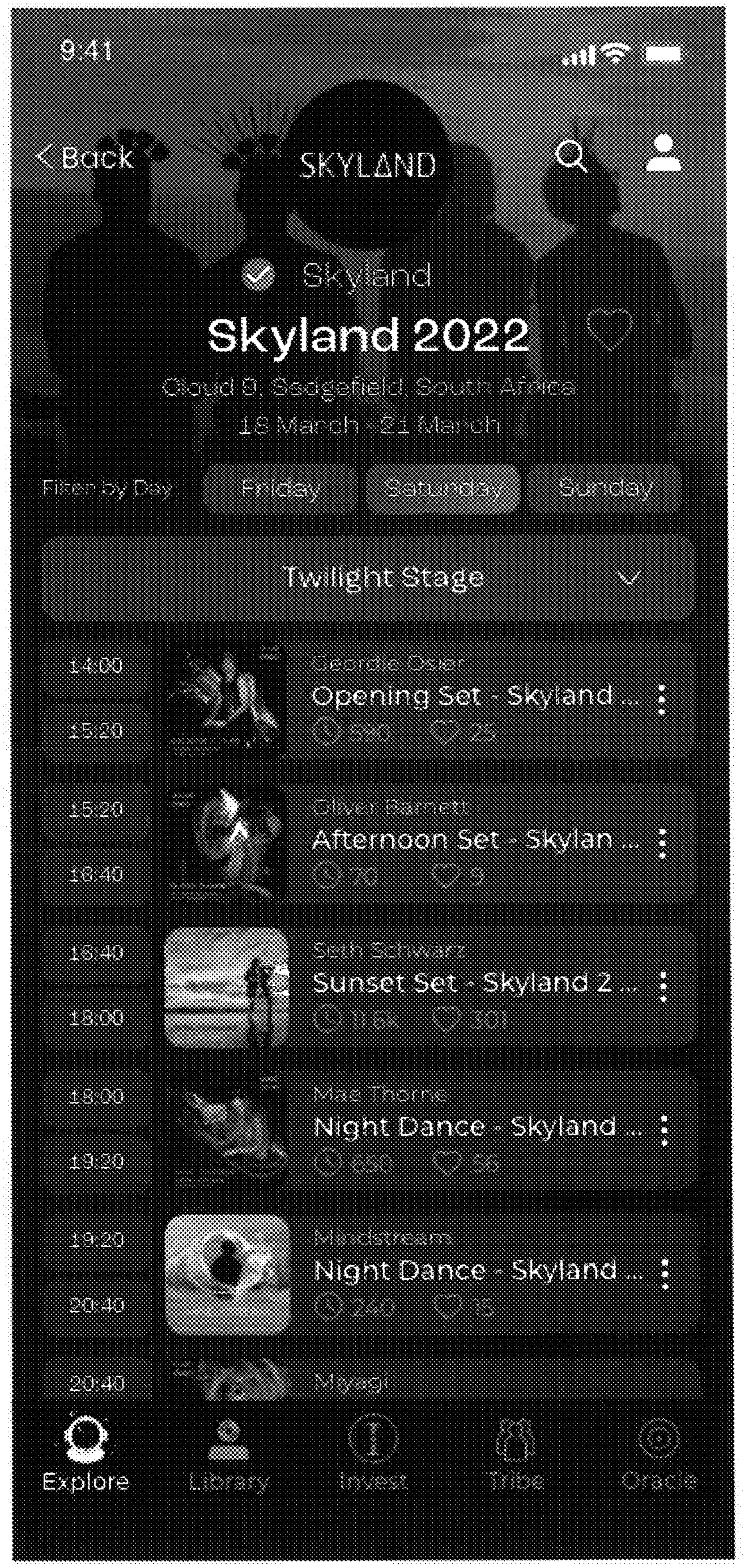
Figure 13:
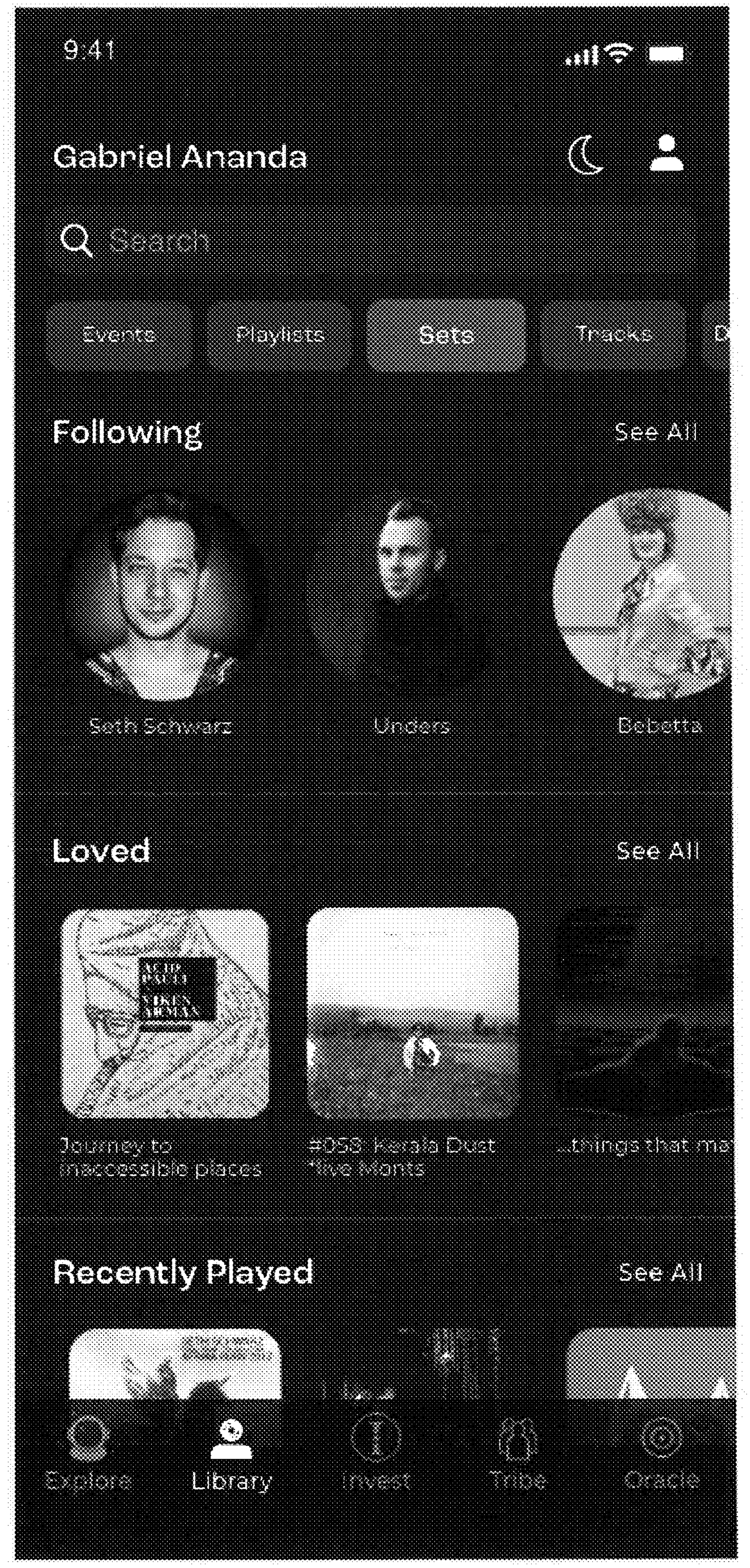
Figure 14:
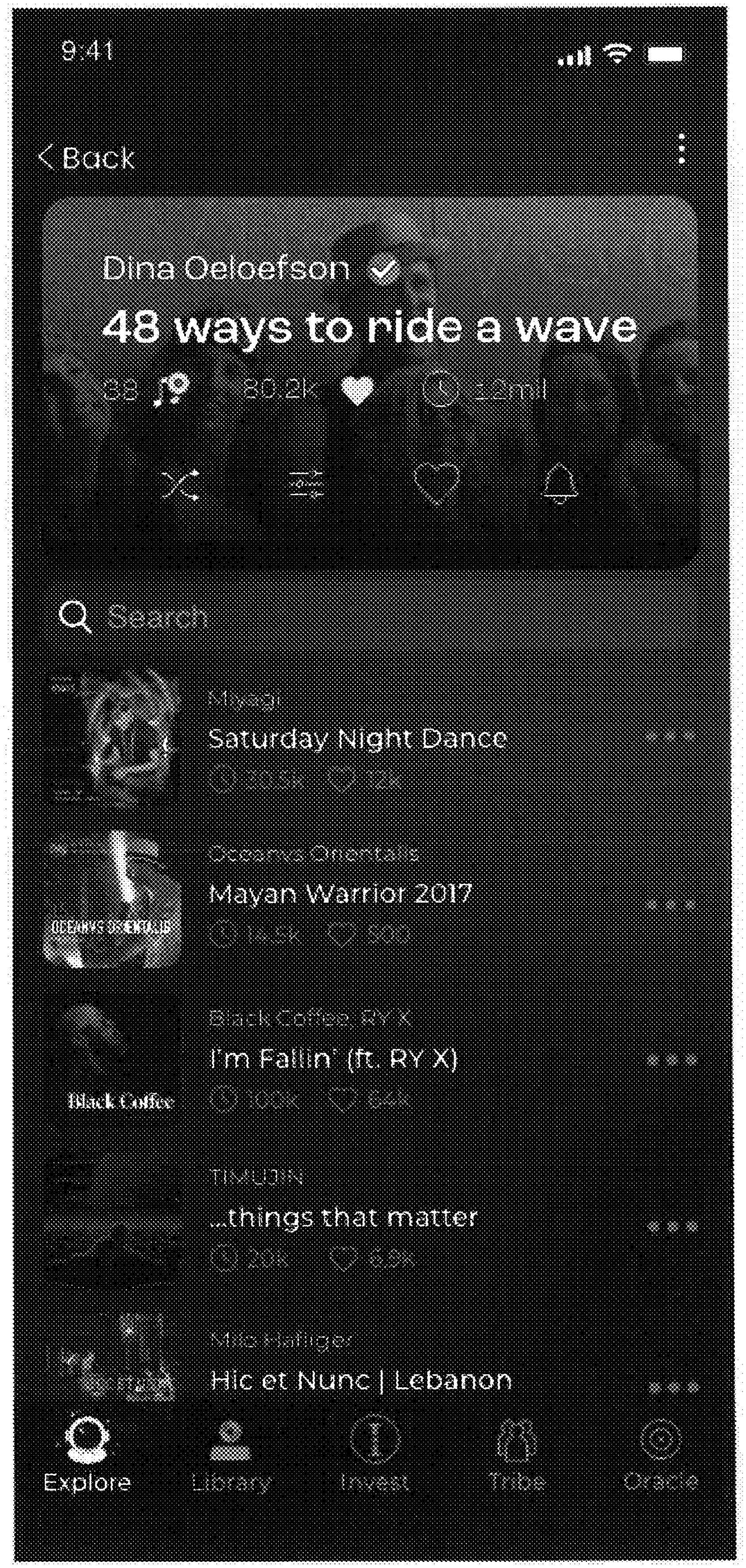
Figure 15A:
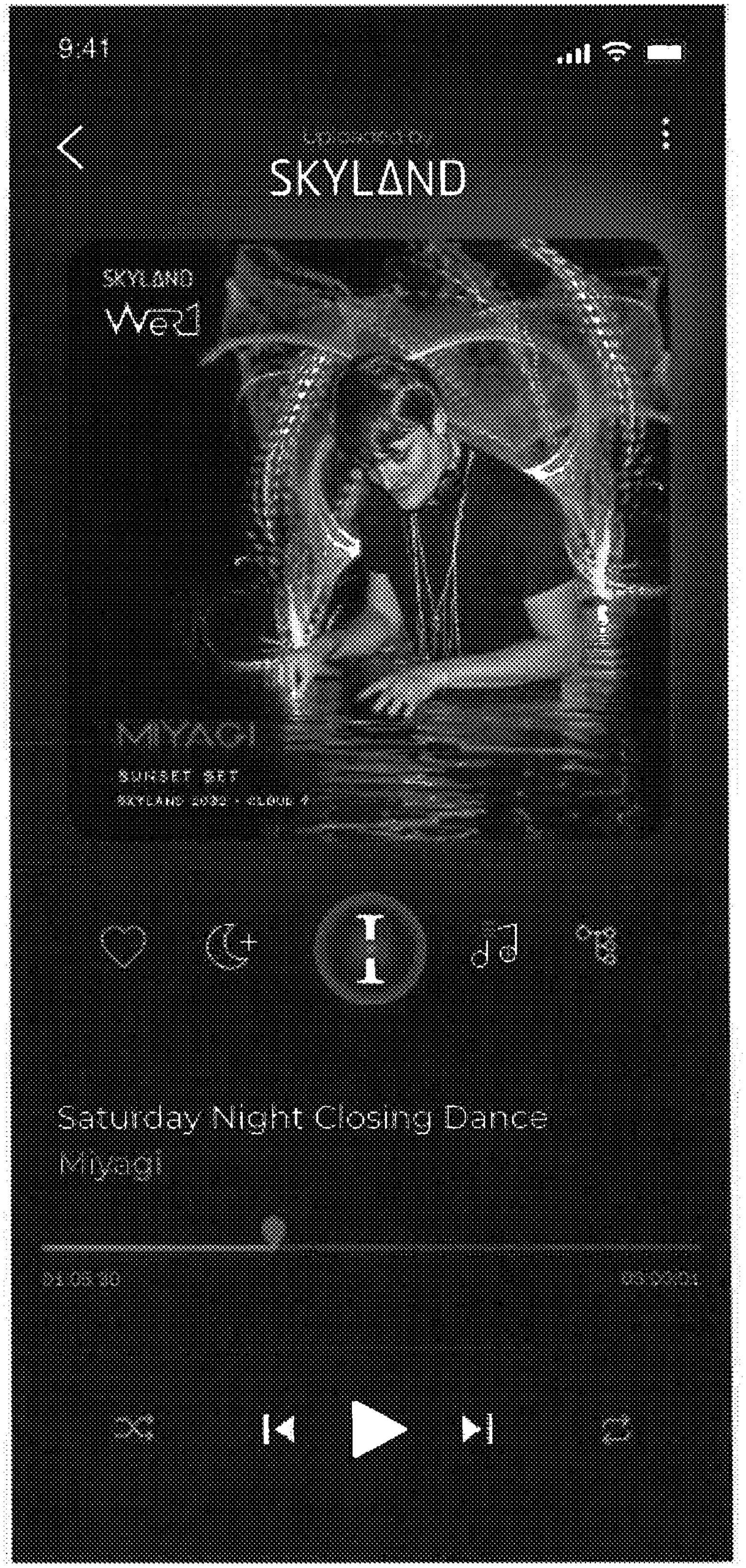
Figure 15B:
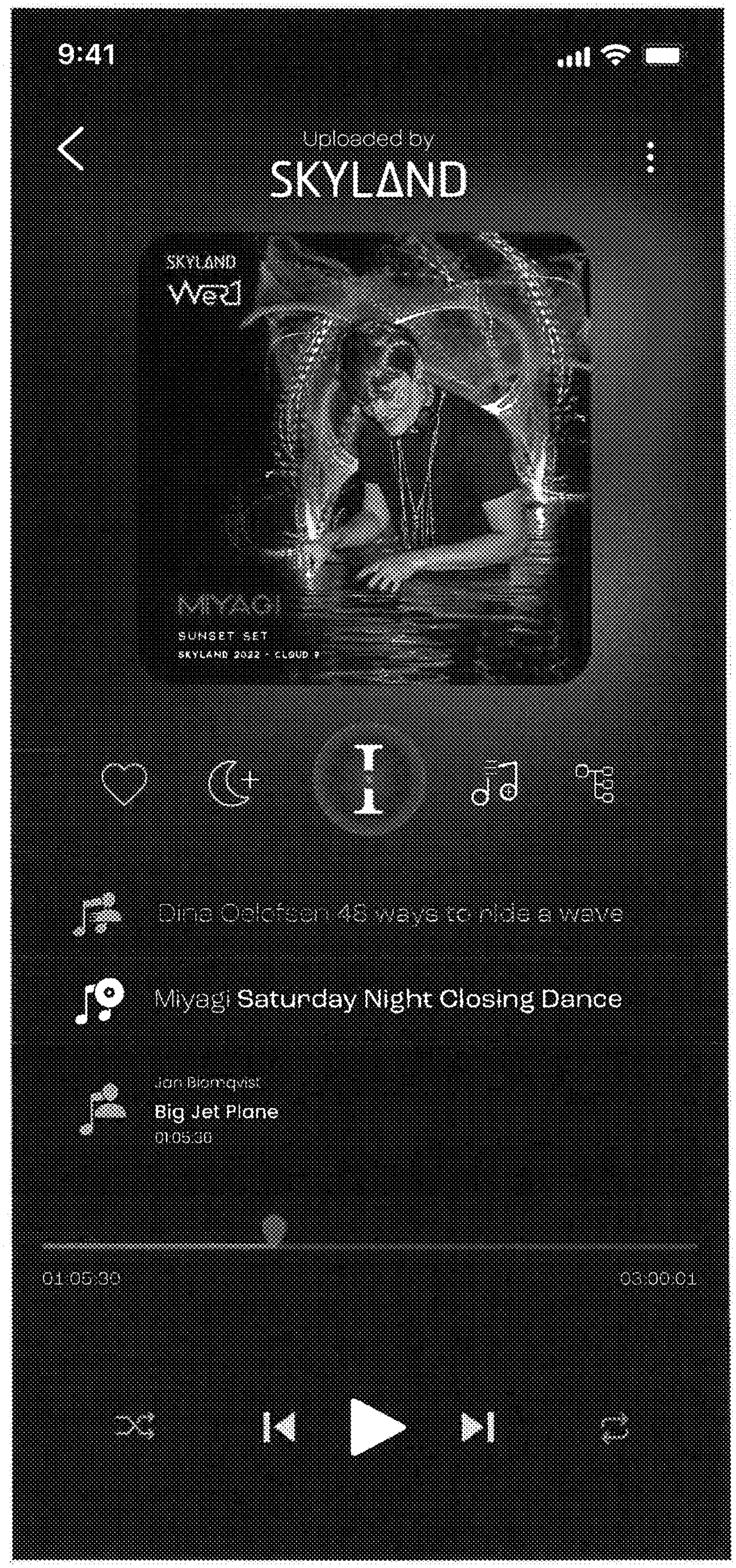
Figure 16:
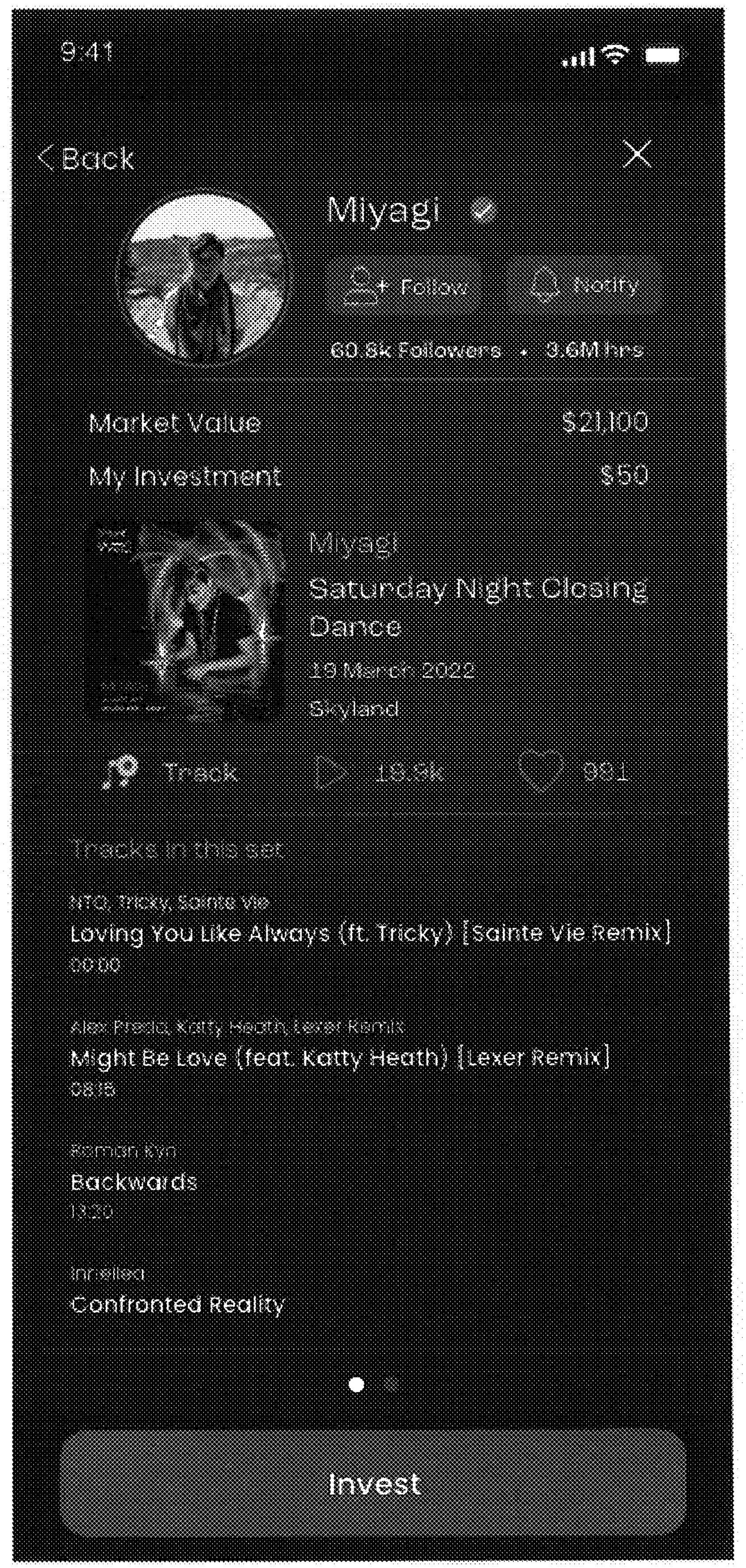
Figure 17:
Figure 18:
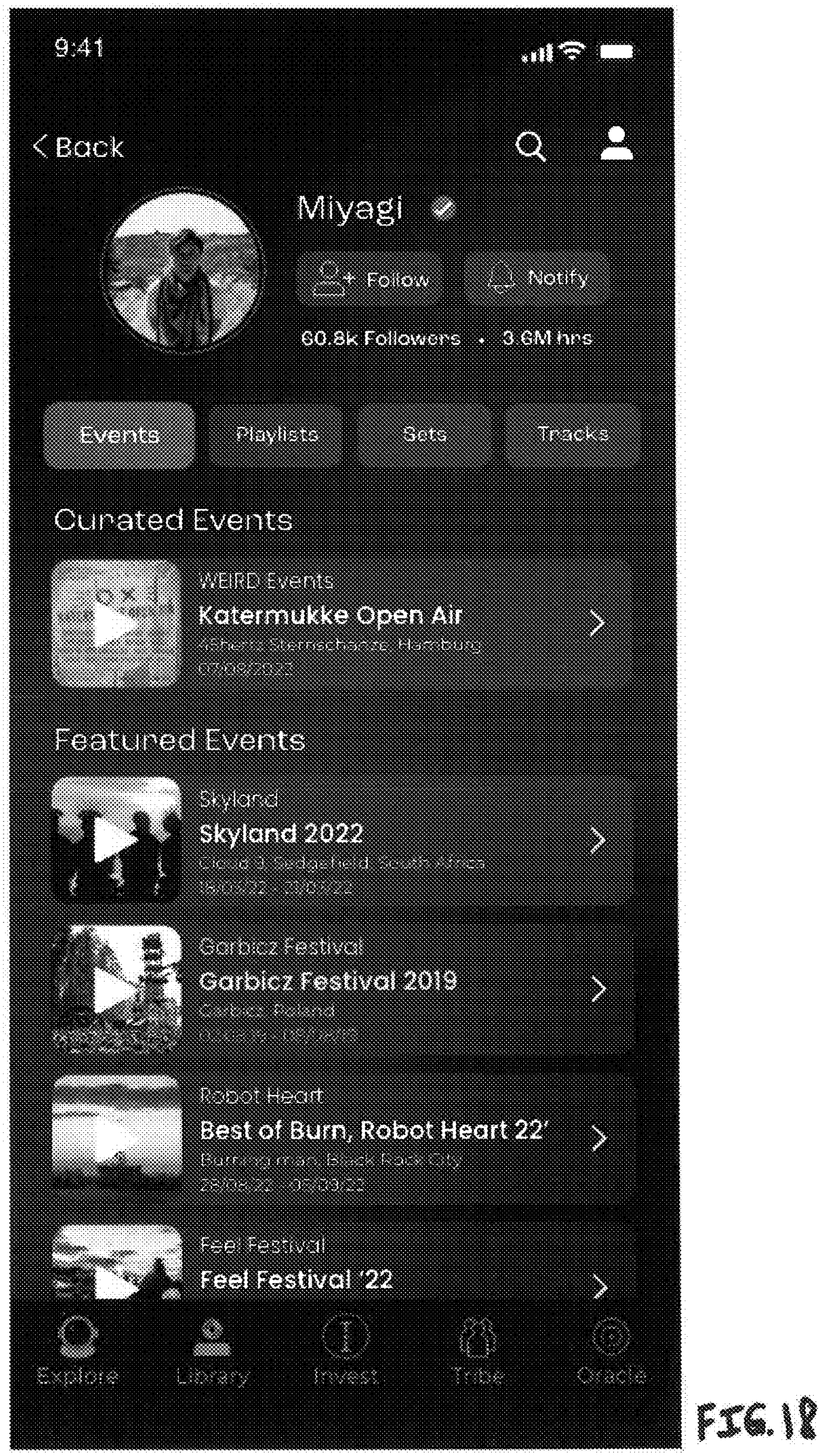
Figure 19:
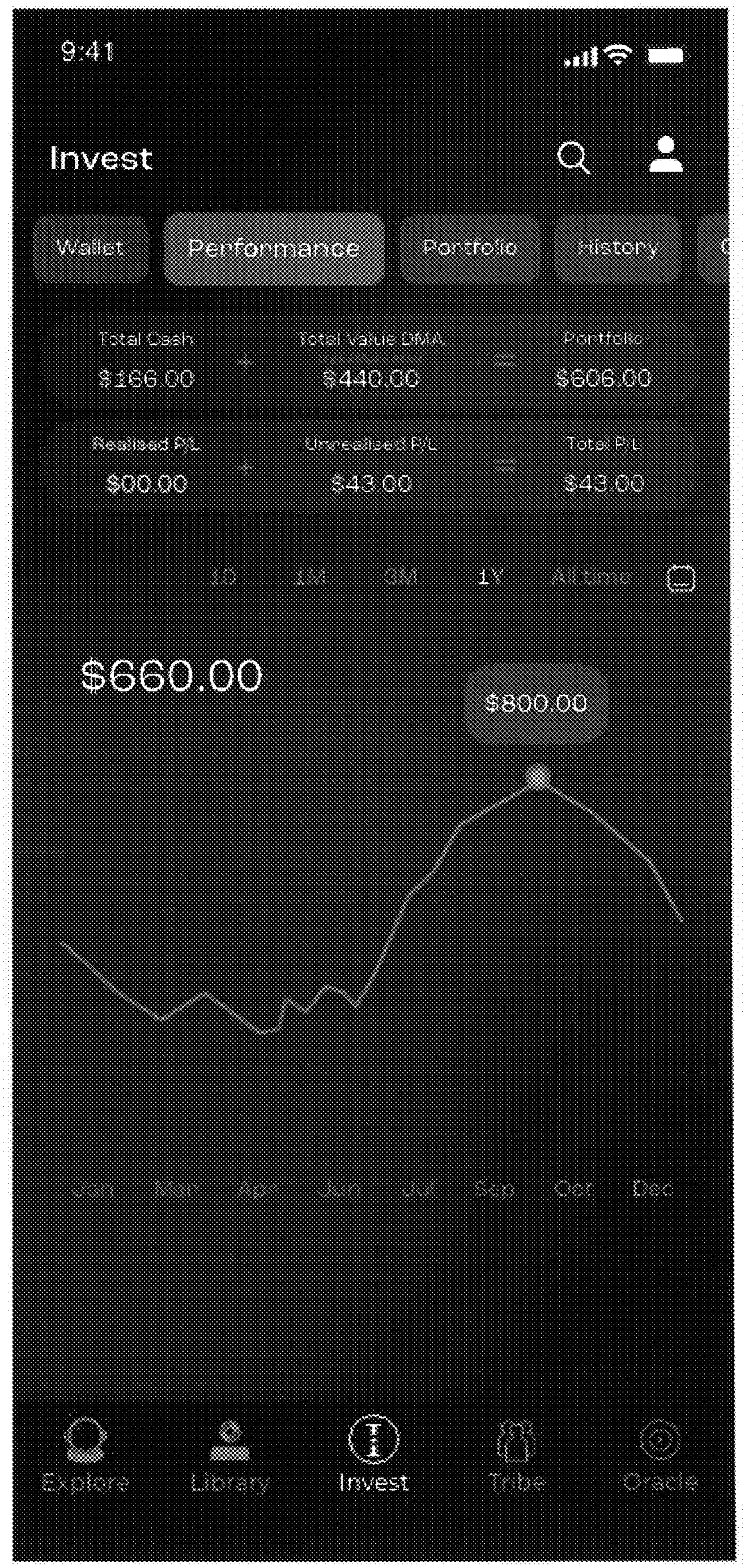
Figure 20:
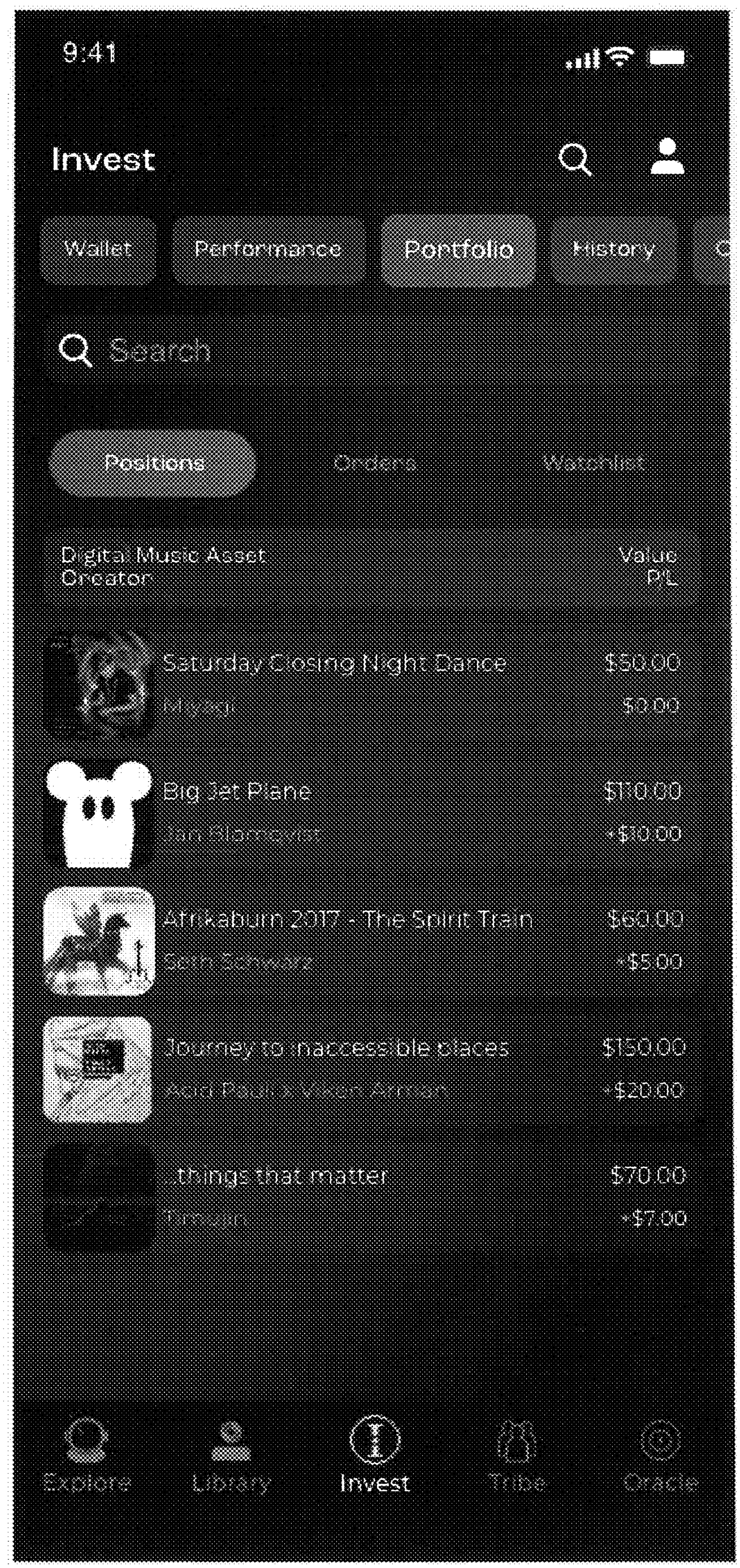
Figure 21:
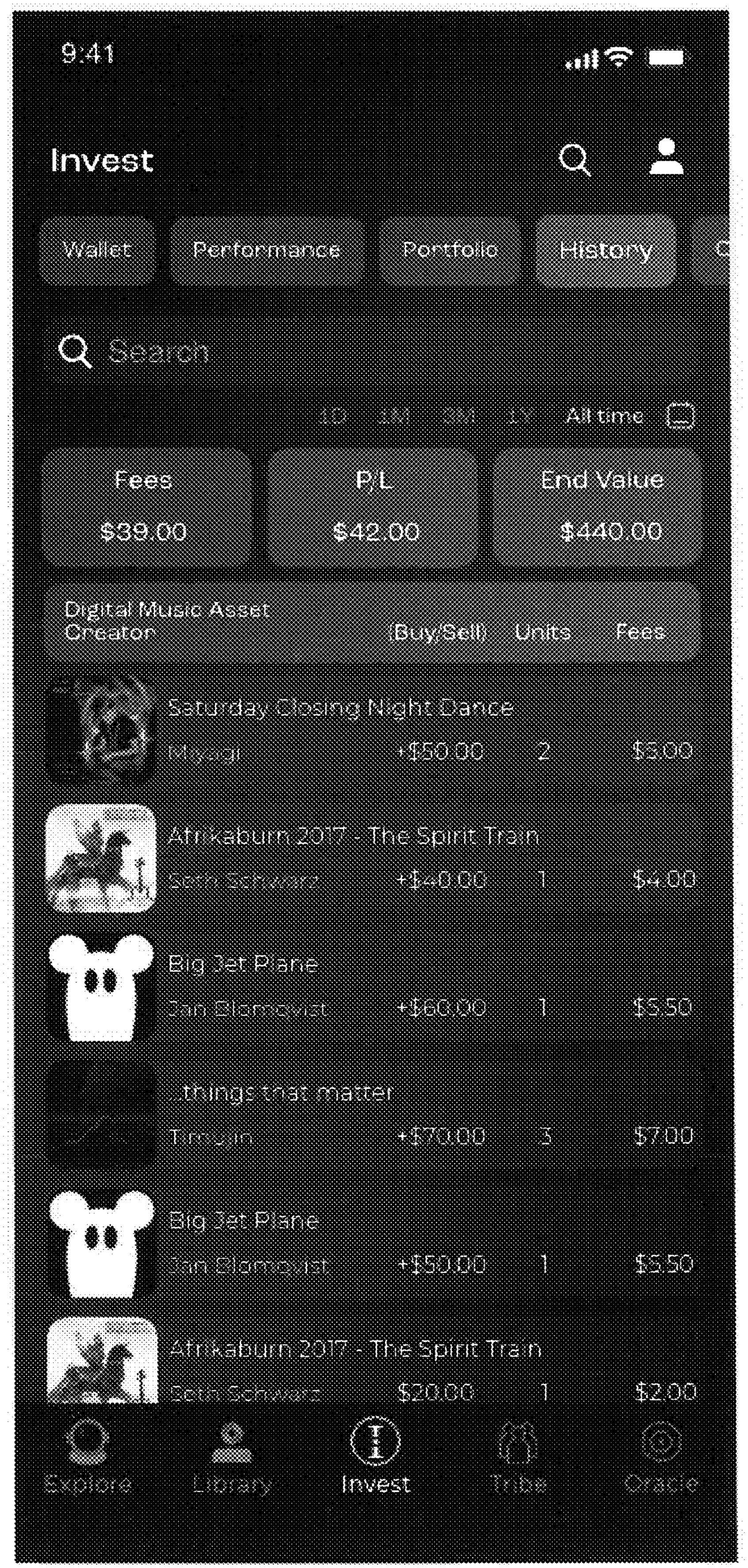
Figure 22:

A more comprehensive representation of the larger model is shown in FIG. 9.

| Layer | Type | Retained Revenue | Pass Through Revenue |
|---|---|---|---|
| 1 | IOC Platform | 30% | 70% |
| 2 | Playlist | 10% | 90% |
| 3 | Audio Visual | 50% | 50% |
| 4 | DJ set | 50% | 50% |
| 5 | Music Tracks | 100% | 0% |
| 5 | Music Tracks | 50% | 50% |
| 6 | Components of music track | 100% | 0% |

The diagram above and in FIG. 9 shows the model with more hierarchy layers and types.

A visual layer is added which can be linked to lower layer sound journeys such as DJ sets.

On the right-hand side, there is a listener listening to DJ set1 followed by DJ set 2, followed by Track 13, then Track 14.

The user's monthly subscription revenue can be divided by the number of minutes streamed, and is then allocated prorate to all the digital assets that contributed to the experience.

This is a more equitable and transparent revenue model for creatives contributing to an ecosystem.

A computing system and algorithm is designed to play music to a user/listener that the user/listener is likely to love, connect with, and thereby possibly invest in. The music is made accessible to the user by types (Holons) such as Playlists, Sets, and Tracks, plus a feature that allows users to search for and play the music that is either more familiar or curious for something new (See FIG. 10). For example, as illustrated in FIGS. 10-22, the application 108 and method 400 allows music streaming by including a slider that allows music search to provide music that is either more familiar or more curious (Fresh/New) to the user.

Although specific features of various embodiments of the disclosure may be shown in some drawings and not in others, this is for convenience only. In accordance with the principles of the disclosure, any feature of a drawing or other embodiment may be referenced and/or claimed in combination with any feature of any other drawing or embodiment.

This written description uses examples to describe embodiments of the disclosure and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A system comprising:

a database configured to store digital assets;

a computing system configured to communicate with the database; and, a network to provide remote access to users so that the users can purchase shares in the digital assets;

an application executable by a processor of a user computing device having a display screen with a graphical user interface (GUI) display screen to display computer-generated images thereon and to communicate with the computing system, wherein the application is configured to display the computer-generated images of the application on the GUI and to have the processor execute an algorithm with instructions to:

create a digital asset by a digital asset creator using the user computing device on an infinite offer curve (IOC) platform, divide, by the IOC platform, initial shares of the digital asset into digital creator residual shares that cannot be sold, digital creator shares available for sale, and liquidity shares available for sale;

offer, by the digital asset creator using the user computing device, a percentage of the digital creator shares in the digital asset for sale;

conduct, by the IOC platform, an auction at a time of listing the digital creator shares for sale;

determine, by the IOC platform, an initial threshold price for the digital creator shares;

conduct, by the IOC platform, the auction by transmitting a notification over the network to the user computing device of the users to participate in an initial offering of the digital creator shares in the digital asset, bidding by the fans users over the network using the user computing device, a set amount at a price level to purchase an interest in the digital asset, and aggregating, by the IOC platform, all bids made by the users, and determining, by the IOC platform, the initial threshold price and number of the liquidity shares to be issued and sold against the digital creator shares for sale; and issue the liquidity shares, by the IOC platform, at the initial threshold price determined by the IOC platform and sell the liquidity shares, by the IOC platform, to successful bidders in the auction on a prorate basis in accordance with the bids made, wherein the liquidity shares are issued inversely proportional to a current threshold price and that the total liquidity shares grow logarithmically with price increases.

2. The system as set forth in claim 1, wherein the computing system is configured to allow the IOC platform to continue to issue and sell the liquidity shares incrementally to the bidders purchasing the liquidity shares above the initial threshold price.

3. The system as set forth in claim 2, wherein the computing system is configured to, once the initial threshold price is reached, make the digital creator shares available by the digital asset creator to sell.

4. The system as set forth in claim 3, wherein the computing system is configured to, once the digital creator shares are no longer available, allow the IOC platform to resume issuing and selling of the liquidity shares.

5. The system as set forth in claim 1, wherein the computing system is configured to link and layer the digital assets.

6. The system as set forth in claim 5, wherein the layers are building blocks in a listening pathway, each layer being a type used to create an overall user experience.

7. The system as set forth in claim 6, wherein the system (i) obtains total minutes streamed per subscriber per asset in the listening pathway, (ii) allocates a subscriber's fee proportionally to the total minutes, and (iii) applies stored pass-through percentages across the layers and records payouts, and paid based on the listening pathway.

8. A method comprising the steps of:

storing, in a database, digital assets;

establishing, by a computing system, communication with the database;

providing a network to provide remote access to users so that the users can purchase shares in the digital assets; and executing an application by a processor of a user computing device having a display screen with a graphical user interface (GUI) display screen to display computer-generated images thereon and to communicate with the computing system, wherein the application is configured to display the computer-generated images of the application on the GUI and to have the processor execute an algorithm with instructions:

create a digital asset by a digital asset creator using the user computing device on an infinite offer curve (IOC) platform, divide, by the IOC platform, initial shares of the digital asset into digital creator residual shares that cannot be sold, digital creator shares available for sale, and liquidity shares available for sale;

offer, by the digital asset creator using the user computing device, a percentage of the digital creator shares in the digital asset for sale;

conduct, by the IOC platform, an auction at a time of listing the digital creator shares for sale;

determine, by the IOC platform, an initial threshold price for the digital creator shares;

conduct, by the IOC platform, the auction by transmitting a notification to the user computing device of the users to participate in an initial offering of the digital creator shares in the digital asset, bidding by the users over the network using the user computing device, a set amount at a price level to purchase an interest in the digital asset, and aggregating, by the IOC platform, all bids made by the users, and determining, by the IOC platform, the initial threshold price and number of the liquidity shares to be issued and sold against the digital creator shares for sale; and issue the liquidity shares, by the JOC platform, at the initial threshold price determined by the IOC platform and sell the liquidity shares, by the IOC platform, to successful bidders in the auction on a prorate basis in accordance with the bids made, wherein the liquidity shares are issued inversely proportional to a current threshold price and that the total liquidity shares grow logarithmically with price increases.

9. The method as set forth in claim 8, including the step of continuing, by the computing system, to issue and sell the liquidity shares incrementally to bidders the purchasing liquidity shares above the initial threshold price.

10. The method as set forth in claim 9, including the step of, once the initial threshold price is reached, making the digital creator shares available by the digital asset creator to sell.

11. The method as set forth in claim 10, including the step of, once the digital creator shares are no longer available, resuming issuing and selling of the liquidity shares.

12. The method as set forth in claim 8, wherein the step of linking and layering, by the computing system, the digital assets.

13. The method as set forth in claim 12, wherein the layers are building blocks in a listening pathway, each layer being a type used to create an overall user experience.

14. The method as set forth in claim 13, including the step of dividing a monthly subscription into listening time for the month, and paid based on the listening pathway.

15. A non-transitory computer readable medium having computer-executable instructions for execution by one or more computing devices for digital assets, the computer-executable instructions comprising the steps of:

create a digital asset by a digital asset creator using a user computing device, divide, by an IOC platform, initial shares of the digital asset into digital creator residual shares that cannot be sold, digital creator shares available for sale, and liquidity shares available for sale;

offer by the digital asset creator using the user computing device, a percentage of the digital creator shares in the digital asset for sale;

conduct, by the JOC platform, an auction at a time of listing the digital creator shares for sale;

determine, by the IOC platform, an initial threshold price for the digital creator shares, conduct, by the IOC platform, the auction by transmitting a notification to the user computing device of users to participate in an initial offering of the digital creator shares in the digital asset, bidding by the users over a network using the user computing device, a set amount at a price level to purchase an interest in the digital asset, and aggregating, by the IOC platform, all bids made by the users, and determining, by the IOC platform, the initial threshold price and number of the liquidity shares to be issued and sold against the digital creator shares for sale; and issue the liquidity shares, by the IOC platform, at the initial threshold price determined by the IOC platform and sell, by the IOC platform, the liquidity shares to successful bidders in the auction on a prorate basis in accordance with the bids made, wherein the liquidity shares are issued inversely proportional to a current threshold price and that the total liquidity shares grow logarithmically with price increases.

16. The non-transitory computer readable medium of claim 15, wherein the computer-executable instructions comprise the step of continuing to issue and sell the liquidity shares incrementally to bidders purchasing the liquidity shares above the initial threshold price.

17. The non-transitory computer readable medium of claim 15, wherein the computer-executable instructions comprise the step of, once the initial threshold price is reached, making the digital creator shares available by the digital asset creator to sell.

18. The non-transitory computer readable medium of claim 17, wherein the computer-executable instructions comprise the step of, once the digital creator shares are no longer available, resuming issuing and selling of the liquidity shares.

19. The non-transitory computer readable medium of claim 18, wherein the computer-executable instructions comprise the step of linking and layering the digital assets.

20. The non-transitory computer readable medium of claim 19, wherein the computer-executable instructions include the layers are building blocks in listening pathway, each layer being a type used to create an overall user experience.

21. The system as set forth in claim 5 wherein a directed graph of digital assets is stored and, upon revenue events, retains a first percentage and passes through a second percentage to linked lower-layer assets, with an optional time-weighted split.

* * * * *